United States Patent
Yoo et al.

(10) Patent No.: US 9,931,008 B2
(45) Date of Patent: Apr. 3, 2018

(54) CLEANING ROBOT AND CONTROL METHOD THEREOF

(71) Applicant: SAMSUNG ELECTRONICS CO., LTD., Suwon-si, Gyeonggi-do (KR)

(72) Inventors: Kyung Hwan Yoo, Gwangju (KR); Joo Sung Moon, Incheon (KR); Jeong Gon Song, Gwangju (KR); Seung Il Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 643 days.

(21) Appl. No.: 14/090,270

(22) Filed: Nov. 26, 2013

(65) Prior Publication Data
US 2014/0150820 A1    Jun. 5, 2014

(30) Foreign Application Priority Data

Nov. 30, 2012 (KR) ........................ 10-2012-0138603

(51) Int. Cl.
*A47L 5/00* (2006.01)
*A47L 9/04* (2006.01)
(Continued)

(52) U.S. Cl.
CPC ............. *A47L 9/2847* (2013.01); *A47L 9/009* (2013.01); *A47L 9/0633* (2013.01);
(Continued)

(58) Field of Classification Search
CPC ...... A47L 9/0488; A47L 9/0633; A47L 9/064; A47L 9/2847; A47L 9/2805; A47L 11/4011
(Continued)

(56) References Cited

U.S. PATENT DOCUMENTS 5,309,592 A * 5/1994 Hiratsuka ........... A47L 11/4011
                                                   15/319
8,412,377 B2* 4/2013 Casey ................. G05D 1/0238
                                                   700/245
(Continued)

FOREIGN PATENT DOCUMENTS

CN         1853549 A      11/2006
CN       101756677 A       6/2010
(Continued)

OTHER PUBLICATIONS

Chinese Office Action dated Jan. 26, 2017 in corresponding Chinese Patent Application No. 201310636974.4, 6 pages.
(Continued)

*Primary Examiner* — Bryan R Muller
(74) *Attorney, Agent, or Firm* — Staas & Halsey LLP

(57) ABSTRACT

A cleaning robot and a control method thereof include a main body traveling on a floor, and a first sub-cleaning tool and a second sub-cleaning tool mounted at left and right sides of the main body so as to be protruded from the inside to the outside of the main body and selectively performing cleaning Insertion of at least one of the first sub-cleaning tool and the second sub-cleaning tool is controlled when the main body is rotated under the condition that an obstacle is detected. Side brushes of the sub-cleaning tools are inserted into the main body according to the rotation direction of the main body when the main body is rotated during traveling, thus preventing collision with the obstacle.

15 Claims, 29 Drawing Sheets

(51) Int. Cl.
*A47L 9/28* (2006.01)
*A47L 9/00* (2006.01)
*A47L 9/06* (2006.01)
*A47L 11/40* (2006.01)
*G05D 1/02* (2006.01)

(52) U.S. Cl.
CPC ........... *A47L 9/2852* (2013.01); *A47L 9/2889* (2013.01); *A47L 11/4011* (2013.01); *A47L 11/4036* (2013.01); *A47L 11/4061* (2013.01); *G05D 1/0255* (2013.01); *A47L 2201/00* (2013.01); *A47L 2201/04* (2013.01); *G05D 1/0246* (2013.01); *G05D 2201/0203* (2013.01)

(58) Field of Classification Search
USPC .................................................. 15/319, 373
See application file for complete search history.

(56) References Cited

U.S. PATENT DOCUMENTS

| 2001/0004719 A1* | 6/2001 | Sommer | A47L 5/30 |
| | | | 701/23 |
| 2013/0092190 A1* | 4/2013 | Yoon | A47L 9/04 |
| | | | 134/18 |
| 2013/0098402 A1* | 4/2013 | Yoon | A47L 11/33 |
| | | | 134/18 |
| 2013/0263889 A1* | 10/2013 | Yoon | A47L 11/24 |
| | | | 134/6 |
| 2014/0109935 A1* | 4/2014 | Jang | A47L 11/4011 |
| | | | 134/18 |

FOREIGN PATENT DOCUMENTS

| CN | 201573207 U | 9/2010 |
| EP | 0 424 229 A1 | 4/1991 |
| EP | 2 583 605 A2 | 4/2013 |
| JP | 62-292124 | 12/1987 |
| JP | 2005-6857 | 1/2005 |
| KR | 10-2009-0033608 | 4/2009 |

OTHER PUBLICATIONS

Extended European Search Report dated Feb. 17, 2017 in corresponding European Patent Application No. 13194574.3, 10 pages.
Chinese Office Action dated Jun. 5, 2017 in related Chinese Patent Application No. 201310636974.4.
Chinese Decision on Grant dated Sep. 5, 2017 in Chinese Patent Application No. 201310636974.4.

* cited by examiner

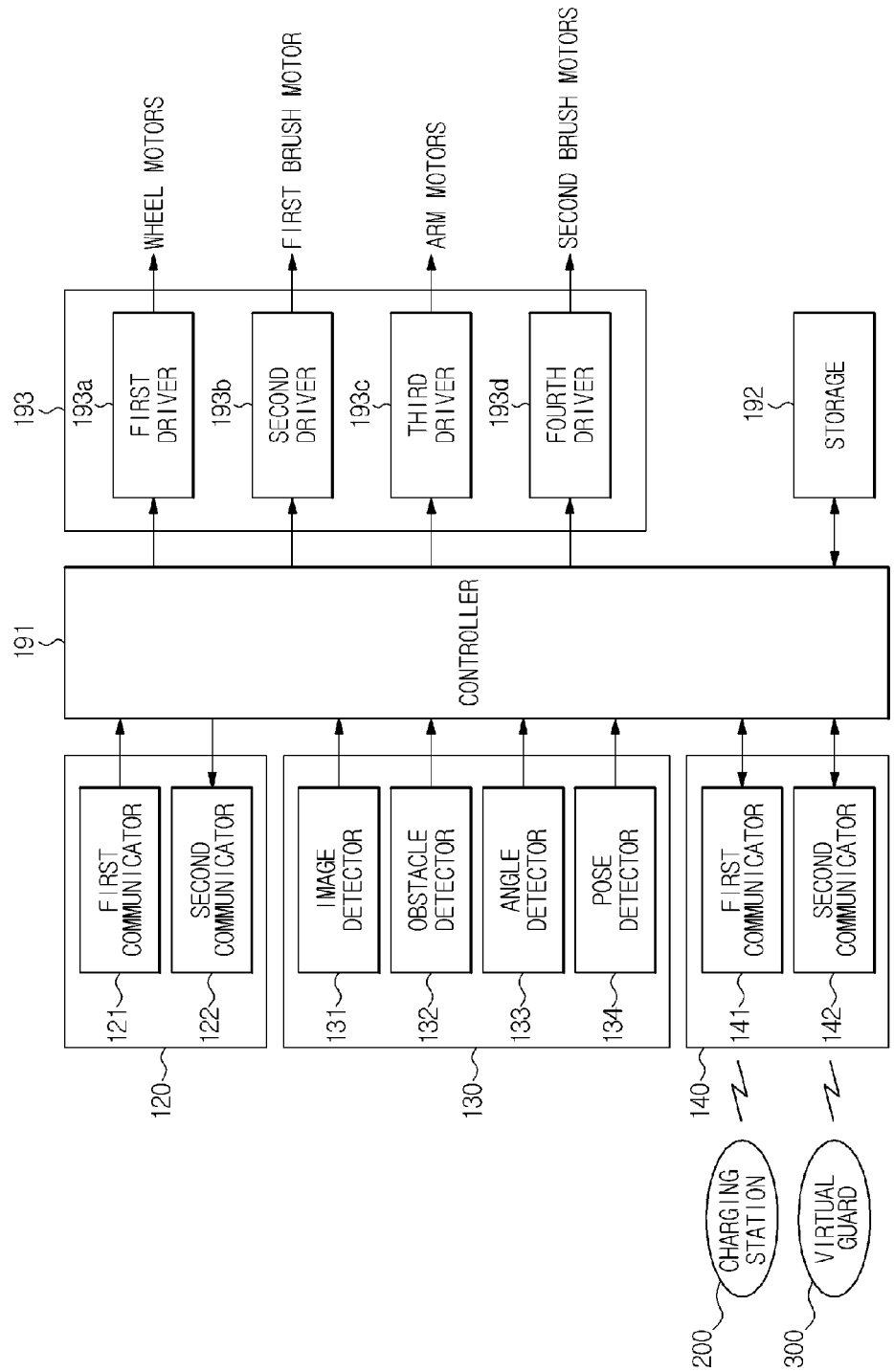

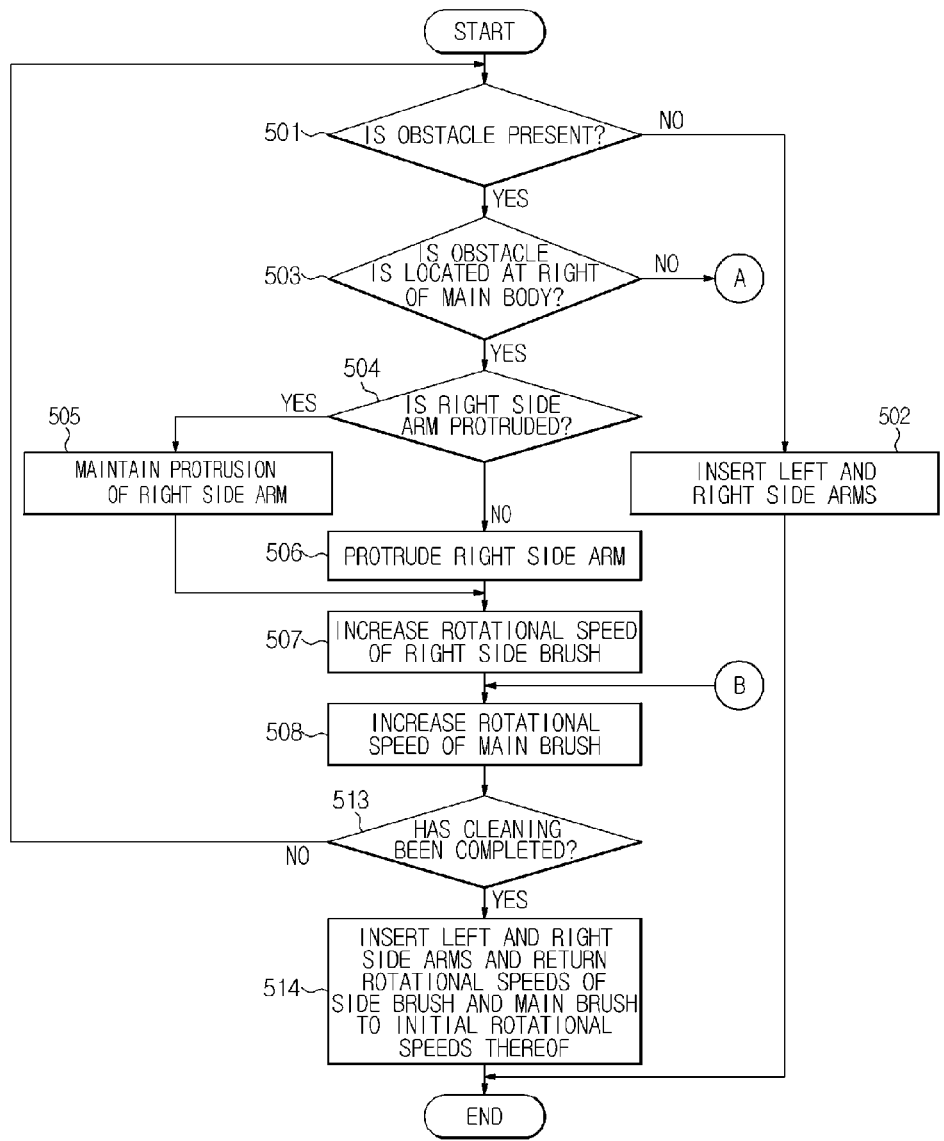

CLEANING ROBOT AND CONTROL METHOD THEREOF

CROSS-REFERENCE TO RELATED APPLICATIONS

This application claims the benefit of Korean Patent Application No. 10-2012-0138603, filed on Nov. 30, 2012 in the Korean Intellectual Property Office, the disclosure of which is incorporated herein by reference.

BACKGROUND

1. Field

One or more embodiments relate to a cleaning robot and a control method thereof to improve cleaning efficiency.

2. Description of the Related Art

In general, a cleaning robot sucks foreign substances, such as dust, from a floor while autonomously traveling about a region to be cleaned without user operation, thus automatically cleaning the region to be cleaned.

The cleaning robot may include a main cleaning tool to remove dust accumulated under the main body of the cleaning robot and sub-cleaning tools that may be formed at both sides of the main body and may protrude outward to clean a region in which an obstacle is present or a region which is not easily cleaned using the main cleaning tool, such as a region adjacent to a wall surface.

The cleaning robot may repeat a cleaning operation using the main cleaning tool and the sub-cleaning tools while traveling according to a predetermined traveling pattern. At this time, the cleaning robot may perform cleaning by sensing an obstacle or a wall located within a cleaning region through various sensors and controlling path movement and cleaning operation based on sensed results.

SUMMARY

Therefore, it is an aspect of the present invention to provide a cleaning robot and a control method thereof which may control insertion of a side arm provided on at least one of a first sub-cleaning tool and a second sub-cleaning tool corresponding to a rotation direction of a main body when the main body is rotated during traveling of the cleaning robot for obstacle tracing.

One or more embodiments relate to a cleaning robot and a control method thereof which may control the rotational speed of a side brush of a main cleaning tool and the rotational speed of side brushes of sub-cleaning tools based on a distance to an obstacle during obstacle tracing.

One or more embodiments relate to a cleaning robot and a control method thereof which may control movement of the position of a main body by judging a possibility of jam and occurrence of jam of a side arm of a sub-cleaning tool.

One or more embodiments relate to a cleaning robot and a control method thereof which may control insertion of side arms provided on sub-cleaning tools based on communication with a virtual guard restricting movement of the cleaning robot into an entry restriction region.

One or more embodiments relate to a cleaning robot and a control method thereof which may control rotation of a main brush of a main cleaning tool and rotation of side brushes of sub-cleaning tools and control insertion of side arms of the sub-cleaning tools based on the amount of power of a battery when cleaning has been completed.

One or more embodiments relate to a cleaning robot and a control method thereof which may manually or automatically perform a test mode to judge whether or not sub-cleaning tools are abnormal.

The foregoing described problems may be overcome and/or other aspects may be achieved by one or more embodiments of a cleaning robot that may include a main body to travel on a floor, an obstacle detector to detect an obstacle around the main body, at least one sub-cleaning tool mounted on the main body configured to be protruded from or inserted into the inside of the main body, and a controller to control operation of the at least one sub-cleaning tool so as to protrude the at least one sub-cleaning tool from the main body when the obstacle is detected, and to control operation of the at least one sub-cleaning tool so as to insert the at least one sub-cleaning tool into the main body when the obstacle is detected and the main body is rotated.

The controller may control operation a sub-cleaning tool located in a rotation direction of the main body based on the front surface of the main body, among the at least one sub-cleaning tool, so that the sub-cleaning tool located in the rotation direction may be inserted into the main body.

The controller may judge whether or not the sub-cleaning tool located in the rotation direction is protruded from the main body, may insert the sub-cleaning tool located in the rotation direction into the main body when the sub-cleaning tool located in the rotation direction is protruded from the main body, and may maintain insertion of the sub-cleaning tool located in the rotation direction when the sub-cleaning tool located in the rotation direction is inserted into the main body.

Each of the at least one sub-cleaning tool may include a side arm mounted on the main body so as to be protruded from or inserted into the inside of the main body, an arm motor rotating the side arm, a side brush rotatably mounted on the side arm, and a brush motor to rotate the side brush.

The at least one sub-cleaning tool may include a first sub-cleaning tool located at the left side of the main body and a second sub-cleaning tool located at the right side of the main body.

The controller may control the arm motor of the first sub-cleaning tool so that the side arm of the first sub-cleaning tool is inserted into the main body, when the rotation direction of the main body is the leftward direction, and may control the arm motor of the second sub-cleaning tool so that the side arm of the second sub-cleaning tool is inserted into the main body, when the rotation direction of the main body is the rightward direction.

The controller may control the arm motor of the first sub-cleaning tool and the arm motor of the second sub-cleaning tool so that the first sub-cleaning tool and the second sub-cleaning tool may be protruded from the main body, when the obstacle is detected.

The controller may judge the position of the obstacle, may control the arm motor of the first sub-cleaning tool so that the side arm of the first sub-cleaning tool may be protruded from the main body, when the position of the obstacle is located at the left of the main body, and may control the arm motor of the second sub-cleaning tool so that the side arm of the second sub-cleaning tool may be protruded from the main body, when the position of the obstacle is located at the right of the main body.

The controller may judge the position of the obstacle, and may control the arm motor of the first sub-cleaning tool and the arm motor of the second sub-cleaning tool so that the first sub-cleaning tool and the second sub-cleaning tool may be protruded from the main body, when the position of the obstacle is located in front of the main body.

The controller may rotate the arm motor in a first direction by designated angles up to a first target angle during control of protrusion of the at least one sub-cleaning tool, and may rotate the arm motor in a second direction by designated angles up to a second target angle during control of insertion of the at least one sub-cleaning tool.

During rotation of the main body, the controller may confirm a distance to the obstacle corresponding to an obstacle detection signal, and may control insertion of the at least one sub-cleaning tool and may adjust the rotational speed of the main body based on the confirmed distance.

The controller may increase the rotational speed of a side brush of the at least one protruded sub-cleaning tool during control of protrusion of the at least one sub-cleaning tool.

The cleaning robot may further include a main cleaning tool mounted on the lower surface of the main body to perform cleaning, wherein the controller may increase the rotational speed of a main brush of the main cleaning tool during increase of the rotational speed of the side brush of the at least one sub-cleaning tool.

The cleaning robot may further include a communicator to communicate with a virtual guard to guide traveling of the main body, wherein the controller may control the at least one sub-cleaning tool so that the at least one sub-cleaning tool may be inserted into the main body, when the communicator receives a virtual guard signal.

The controller may judge whether or not cleaning has been completed, and may insert a side arm of the at least one sub-cleaning tool into the main body and may rotate a side brush of the at least one sub-cleaning tool, when cleaning has been completed.

The cleaning robot may further include a user interface to receive a command for a test mode to test whether or not the at least one sub-cleaning tool is abnormal and to output results of the test mode, and the controller, when the command for the test mode is input through the user interface, may control at least one of protrusion and insertion of the at least one sub-cleaning tool and may judge whether or not the at least one sub-cleaning tool is abnormal based on a signal generated when the at least one sub-cleaning tool is operated.

The controller may perform a test mode to test whether or not the at least one sub-cleaning tool is abnormal before traveling of the main body is started.

The cleaning robot may further include a switch turned on when the at least one sub-cleaning tool is inserted into the main body and turned off when the at least one sub-cleaning tool is protruded from the main body, and the controller may judge whether or not the at least one sub-cleaning tool is abnormal based on an on/off signal transmitted from the switch.

The cleaning robot may further include a pose detector to detect a movement amount corresponding to a change of the position and pose of the main body, and the controller may judge whether or not jam of the obstacle into the at least one sub-cleaning tool occurs by comparing a target movement amount corresponding to traveling of the main body and the detected movement amount under the condition that the obstacle is detected during traveling of the main body, and may control movement of the main body and insertion of the at least one sub-cleaning tool when a jam of the obstacle into the at least one sub-cleaning tool has occurred.

The foregoing described problems may be overcome and/or other aspects may be achieved by one or more embodiments of a control method of a cleaning robot which may have a main body, a main cleaning tool mounted on the lower surface of the main body, and a first sub-cleaning tool and a second sub-cleaning tool mounted on the left and right side surfaces of the main body so as to be protruded from or inserted into the inside of the main body. The control method may include detecting an obstacle, protruding at least one of the first sub-cleaning tool and the second sub-cleaning tool to the outside of the main body, when the obstacle is detected, and judging the rotation direction of the main body and inserting the sub-cleaning tool mounted in the judged rotation direction is inserted into the main body, when the obstacle is detected and the main body is rotated.

The insertion of the sub-cleaning tool mounted in the judged rotation direction may include when the rotation direction of the main body is the leftward direction, judging whether or not the first sub-cleaning tool is in an inserted state, maintaining insertion of the first sub-cleaning tool when the first sub-cleaning tool is in the inserted state, and inserting the first sub-cleaning tool into the main body when the first sub-cleaning tool is in a protruded state, and when the rotation direction of the main body is the rightward direction, judging whether or not the second sub-cleaning tool is in the inserted state, maintaining insertion of the second sub-cleaning tool when the second sub-cleaning tool is in the inserted state, and inserting the second sub-cleaning tool into the main body when the second sub-cleaning tool is in the protruded state.

The protrusion of the at least one of the first sub-cleaning tool and the second sub-cleaning tool may include judging whether or not the at least one of the first sub-cleaning tool and the second sub-cleaning tool is in a protruded state, maintaining protrusion of the at least one of the first sub-cleaning tool and the second sub-cleaning tool when the at least one of the first sub-cleaning tool and the second sub-cleaning tool is in the protruded state, and protruding the at least one of the first sub-cleaning tool and the second sub-cleaning tool from the main body when the at least one of the first sub-cleaning tool and the second sub-cleaning tool is in an inserted state.

The protrusion of the at least one of the first sub-cleaning tool and the second sub-cleaning tool may include rotating an arm motor to rotate a side arm of the at least one of the first sub-cleaning tool and the second sub-cleaning tool in a first direction by a designated angle up to a first target angle.

The insertion of the sub-cleaning tool mounted in the judged rotation direction may include rotating the arm motor to rotate the side arm of the sub-cleaning tool mounted in the judged rotation direction in a second direction by a designated angle up to a second target angle.

The first target angle and the second target angle may have the same angle displacement.

The control method may further include initializing the first target angle and the second target angle when the insertion of the sub-cleaning tool has been completed.

The control method may further include performing obstacle tracing in which the main body traces the obstacle when the obstacle is detected, and maintaining the protruded state of the first sub-cleaning tool and the second sub-cleaning tool for a predetermined time when obstacle tracing has been completed.

The control method may further include confirming the position of the obstacle, protruding the first sub-cleaning tool and the second sub-cleaning tool from the main body when it is confirmed that the obstacle is located in front of the main body, determining an obstacle tracing direction when obstacle tracing in which the main body traces the obstacle has been determined, determining rotation of the main body so that the main body may travel in the determined obstacle tracing direction, inserting the sub-cleaning tool located in the rotation direction of the main body into the main body, and protruding the inserted sub-cleaning tool from the main body when rotation of the main body has been completed.

The control method may further include inserting side arms of the first sub-cleaning tool and the second sub-cleaning tool into the main body and rotating side brushes of the first sub-cleaning tool and the second sub-cleaning tool, when the obstacle is not detected.

The insertion of the sub-cleaning tool mounted in the judged rotation direction into the main body may include detecting a distance to the obstacle based on an obstacle detection signal, when the main body is rotated, comparing the detected distance with a designated distance, controlling insertion of the sub-cleaning tool while adjusting the rotational speed of the main body, when the detected distance exceeds the designated distance, and stopping rotation of the main body, inserting the sub-cleaning tool into the main body, and re-rotating the main body after the insertion of the sub-cleaning tool has been completed, when the detected distance does not exceed the designated distance.

The control method may further include judging whether or not a designated time from a point of time when rotation of the main body has been completed elapses, when rotation of the main body has been completed, and protruding the inserted sub-cleaning tool from the main body, when the designated time has elapsed.

The control method may further include increasing the rotational speed of a side brush of the sub-cleaning tool mounted in the opposite direction to the rotation direction.

The control method may further include increasing the rotational speed of a main brush of the main cleaning tool mounted on the lower surface of the main body.

The control method may further include returning the rotational speed of the side brush of the sub-cleaning tool to its original speed, when obstacle tracing in which the main body traces the obstacle has been completed.

The control method may further include confirming whether or not a signal from a virtual guide to guide traveling of the main body is received, and controlling the at least one of the first sub-cleaning tool and the second sub-cleaning tool so that the at least one of the first sub-cleaning tool and the second sub-cleaning tool is inserted into the main body, when the signal from the virtual guide is received.

The control method may further include judging whether or not cleaning has been completed, inserting a side arm of the at least one of the first sub-cleaning tool and the second sub-cleaning tool into the main body, when cleaning has been completed, rotating a side brush of the at least one of the first sub-cleaning tool and the second sub-cleaning tool, and performing docking of the main body with a charging station.

The performance of docking of the main body with the charging station may include confirming an amount of power of a battery, comparing the confirmed amount of power of the battery with a reference amount, stopping operation of the main cleaning tool, when the confirmed amount of power of the battery is below the reference amount, and maintaining operation of the main cleaning tool, when the confirmed amount of power of the battery is not below the reference amount.

The control method may further include decreasing the rotational speed of the side brush of the at least one of the first sub-cleaning tool and the second sub-cleaning tool, when the confirmed amount of power of the battery is below the reference amount.

The control method may further include judging whether or not a test mode is input to a user interface, protruding the first sub-cleaning tool and the second sub-cleaning tool from the main body when the test mode is input, judging whether or not the first sub-cleaning tool and the second sub-cleaning tool are abnormal by confirming analog-digital conversion signals generated when the first sub-cleaning tool and the second sub-cleaning tool are protruded from the main body, and outputting abnormality or normality of the first sub-cleaning tool and the second sub-cleaning tool to the user interface.

The control method may further include protruding the at least one of the first sub-cleaning tool and the second sub-cleaning tool from the main body before traveling of the main body, when a cleaning command is input to a user interface, judging whether or not the at least one of the first sub-cleaning tool and the second sub-cleaning tool is abnormal by confirming an analog-digital conversion signal generated when the at least one the first sub-cleaning tool and the second sub-cleaning tool is protruded from the main body, and outputting abnormality or normality of the at least one of first sub-cleaning tool and the second sub-cleaning tool to the user interface.

The control method may further include protruding the at least one of the first sub-cleaning tool and the second sub-cleaning tool from the main body before traveling of the main body, when a cleaning command is input to a user interface, judging whether or not the at least one of the first sub-cleaning tool and the second sub-cleaning tool is abnormal by confirming whether or not an off signal is received from a switch provided on the at least one of the first sub-cleaning tool and the second sub-cleaning tool, when the at least one the first sub-cleaning tool and the second sub-cleaning tool is protruded from the main body, and outputting abnormality or normality of the at least one of first sub-cleaning tool and the second sub-cleaning tool to the user interface.

The control method may further include detecting a movement amount of the main body, when the obstacle is detected, comparing a target movement amount corresponding to traveling of the main body and the detected movement amount, judging that a jam of the obstacle into the at least one of the first sub-cleaning tool and the second sub-cleaning tool occurs, when the target movement amount and the detected movement amount are different, determining the movement direction of the main body based on a direction in which the obstacle is located, controlling movement of the main body in the determined movement direction, and inserting the at least one of the first sub-cleaning tool and the second sub-cleaning tool into the main body.

The control method may further include confirming a distance to the obstacle, when the obstacle is detected, and inserting the first sub-cleaning tool and the second sub-cleaning tool into the main body, when the confirmed distance does not exceed a designated distance.

The foregoing described problems may be overcome and/or other aspects may be achieved by one or more embodiments of a cleaning robot that may include a main body, an obstacle detector to detect an obstacle around the main body, sub-cleaning units, each of which may include a side arm mounted on the main body so as to be protruded from the inside to the outside of the main body and a side brush rotatably mounted on the side arm, and a controller to control protrusion of the side arms of the sub-cleaning units so that the side arms may be protruded from the main body and to increase the rotational speed of the side brushes of the sub-cleaning units, when the obstacle is detected.

The sub-cleaning tools may include a first sub-cleaning tool located at the left side of the main body and a second sub-cleaning tool located at the right side of the main body, and the controller may confirm the position of the obstacle and may increase the rotational speed of the side brush of the sub-cleaning tool mounted at the confirmed position of the obstacle, when the obstacle is detected.

When the obstacle is detected and the main body is rotated, the controller may confirm the rotation direction of the main body, may control insertion of the sub-cleaning tool mounted in the confirmed rotation direction, may control protrusion of the sub-cleaning tool mounted in the opposite direction to the confirmed rotation direction, and may increase the rotational speed of the side brush of the side arm of the protruded sub-cleaning tool.

The foregoing described problems may be overcome and/or other aspects may be achieved by one or more embodiments of a cleaning robot that may include a main body, sub-cleaning units, each of which may include a side arm mounted on the main body so as to be protruded from the inside to the outside of the main body and a side brush rotatably mounted on the side arm, and a controller to judge whether or not cleaning has been completed, and to control insertion of the side arms of the sub-cleaning units, to decrease the rotational speed of the side brushes of the sub-cleaning units, and to control docking of the main body, when cleaning has been completed.

The controller may confirm an amount of power of a battery, and may decrease the rotational speed of the side brushes when the confirmed amount of power of the battery is below a reference amount.

The cleaning robot may further include a main cleaning tool mounted on the lower surface of the main body, wherein the controller may maintain operation of the main cleaning tool when the confirmed amount of power of the battery is not below the reference amount, and may stop operation of the main cleaning tool when the confirmed amount of power of the battery is below the reference amount.

The foregoing described problems may be overcome and/or other aspects may be achieved by one or more embodiments of a cleaning robot that may include a main body, a detector to detect an obstacle and a moving amount of the main body, sub-cleaning units mounted on the main body so as to be protruded from the inside to the outside of the main body, and a controller to judge whether or not jam of the obstacle into the sub-cleaning tools occurs by comparing a target moving amount corresponding to traveling of the main body and the detected moving amount when the obstacle is detected, and to control the sub-cleaning units and a traveling direction of the main body when jam of the obstacle into the sub-cleaning tools has occurred.

The detector may detect the obstacle located in front of or at the left or right of the main body, and the controller may judge the position of the obstacle when a distance to the obstacle is below a designated distance, may control insertion of the sub-cleaning tools and then may change the traveling direction of the main body when the obstacle is located in front of the main body, and may change the traveling direction of the main body and then controls insertion of the sub-cleaning tools when the obstacle is located at the left or right of the main body.

The foregoing described problems may be overcome and/or other aspects may be achieved by one or more embodiments of a control method of a cleaning robot which has a main body, a main cleaning tool mounted on the lower surface of the main body to perform cleaning, and a first sub-cleaning tool and a second sub-cleaning tool mounted at the left and right side surfaces of the main body so as to be protruded from or inserted into the inside of the main body and to perform cleaning. The control method may include detecting an obstacle, protruding a side arm provided on the first sub-cleaning tool and a side arm provided on the second sub-cleaning tool, when the obstacle is detected, and increasing the rotational speed of at least one of a side brush provided on the first sub-cleaning tool and a side brush provided on the second sub-cleaning tool.

The increase of rotational speed of the at least one of the side brushes may include confirming the position of the obstacle, and increasing the rotational speed of the side brush of the sub-cleaning tool corresponding to the confirmed position of the obstacle.

The control method may further include judging whether or not the main body is rotated, when the obstacle is detected, confirming the rotating direction of the main body when the main body is rotated, controlling insertion of the side arm of the sub-cleaning tool mounted in the confirmed rotating direction, controlling protrusion of the side arm of the sub-cleaning tool mounted in the opposite direction to the confirmed rotating direction, and increasing the rotational speed of the side brush mounted on the protruded side arm.

The control method may further include maintaining an inserted state of the side arms provided on the sub-cleaning tools for a designated time when rotation of the main body has been completed, and protruding the inserted side arms of the sub-cleaning tools after the designated time has elapsed.

The control method may further include maintaining a protruded state of the side arms for a designated time when the obstacle is not detected during obstacle tracing, and inserting the side arms into the main body after the designated time has elapsed.

The control method may further include counting a number of protrusions of the first sub-cleaning tool and a number of protrusions of the second sub-cleaning tool within a designated region, and inserting the first sub-cleaning tool and the second sub-cleaning tool into the main body when the counted number of protrusions of the first sub-cleaning tool or the counted number of protrusions of the first sub-cleaning tool is a designated number or more.

The control method may further include counting a number of protrusions of the first sub-cleaning tool and a number of protrusions of the second sub-cleaning tool for a reference time, and inserting the first sub-cleaning tool and the second sub-cleaning tool into the main body when the counted number of protrusions of the first sub-cleaning tool or the counted number of protrusions of the first sub-cleaning tool is a designated number or more.

The foregoing described problems may be overcome and/or other aspects may be achieved by one or more embodiments of a control method of a cleaning robot which has a main body, a main cleaning tool mounted on the lower surface of the main body to perform cleaning, and sub-cleaning tools mounted on the side surfaces of the main body so as to be protruded from the inside to the outside of the main body. The control method may include judging whether or not cleaning has been completed, controlling insertion of side arms of the sub-cleaning tools into the main body, when cleaning has been completed, decreasing the rotational speeds of side brushes of the sub-cleaning tools; and performing docking of the main body with a charging station.

The control method may further include confirming an amount of power of a battery, comparing the confirmed amount of power of the battery with a reference amount, maintaining operation of the main cleaning tool, when the confirmed amount of power of the battery is not below the reference amount, and stopping operation of the main cleaning tool and additionally decreasing the rotational speed of the side brushes, when the confirmed amount of power of the battery is below the reference amount.

The foregoing described problems may be overcome and/or other aspects may be achieved by one or more embodiments of a control method of a cleaning robot which has a main body, a main cleaning tool mounted on the lower surface of the main body to perform cleaning, and sub-cleaning tools mounted on the side surfaces of the main body so as to be protruded from the inside to the outside of the main body. The control method may include detecting an obstacle while performing traveling of the main body, detecting a movement amount of the main body, when the obstacle is detected, comparing a target movement amount corresponding to traveling of the main body and the detected movement amount, judging that a jam of the obstacle into the sub-cleaning tools occurs, when the target movement amount and the detected movement amount are different, inserting the sub-cleaning tools into the main body when jam of the obstacle into the sub-cleaning tools has occurred, and controlling traveling of the main body.

The control method may further include judging the position of the obstacle when a distance to the obstacle is below a designated distance, controlling insertion of the sub-cleaning tools and then changing the traveling direction of the main body when the obstacle is located in front of the main body, changing the traveling direction of the main body to the rightward direction and then inserting the sub-cleaning tools into the main body when the obstacle is located at the left of the main body, and changing the traveling direction of the main body to the leftward direction and then inserting the sub-cleaning tools into the main body when the obstacle is located at the right of the main body.

The detection of the movement amount of the main body may include detecting movement displacement corresponding to the position and pose of the robot using a gyro sensor.

The detection of the movement amount of the main body may include detecting movement displacement of the main body using images detected through an image detector.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which:

FIG. 7A is a control block diagram of a cleaning robot in accordance with one or more embodiments;

FIGS. 11A and 11B are a flowchart illustrating a control method of sub-cleaning tools when an obstacle is detected during traveling of a cleaning robot in accordance with one or more embodiments;

DETAILED DESCRIPTION

Figure 1A:
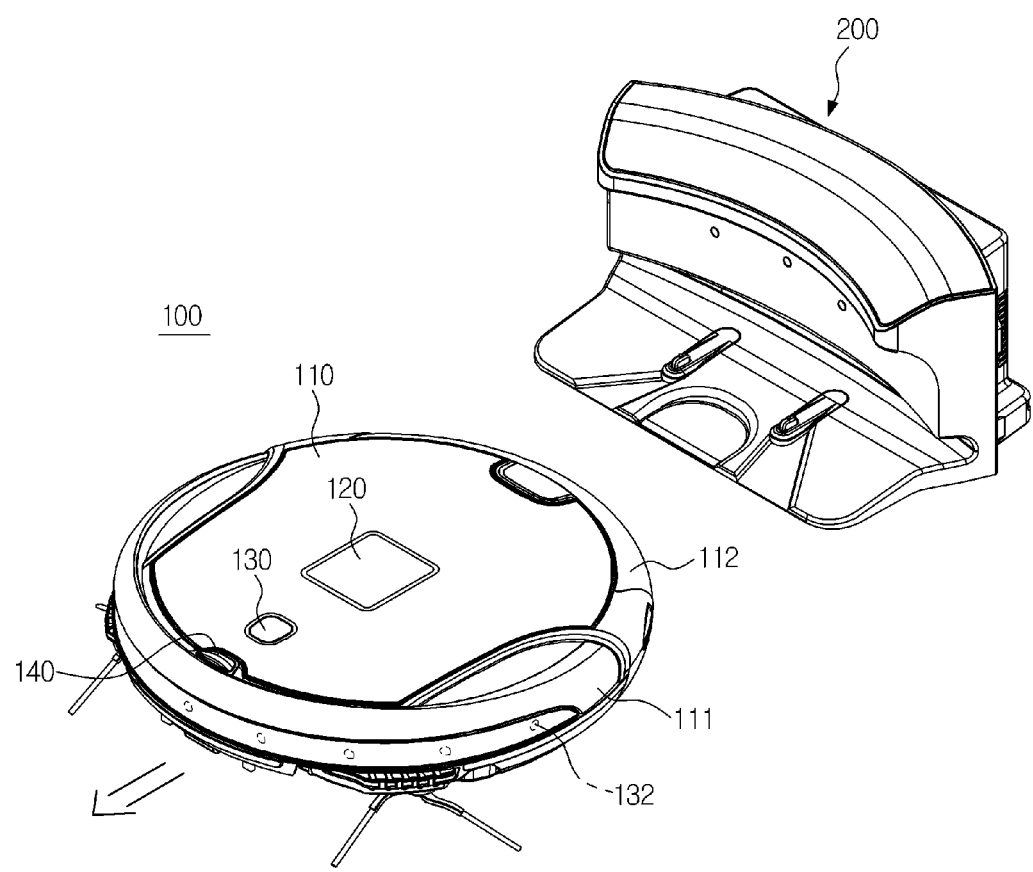
FIG. 1A is a perspective plan view of a cleaning robot in accordance with one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

A cleaning robot 100 performs cleaning by sucking foreign substances, such as dust, from a floor while autonomously traveling about a region to be cleaned, when a cleaning command is input by a user or a reservation time arrives. The cleaning robot 100 may dock with a charging station 200 when cleaning has been completed or when the amount of remaining power of a battery is below a reference amount, and may charge the battery using power supplied from the charging station 200 when docking with the charging station 200 has been completed.

Here, the charging station 200 may include a transformer connected to an external commercial AC power supply, receiving the external commercial AC power, and transforming the received external commercial AC power, a rectifier performing half-wave rectification or full-wave rectification of the transformed power, a smoothing unit smoothing the rectified power, and a voltage adjustment unit outputting DC power having a regular voltage as the smoothed power. The charging station 200 may supply the DC power output from the voltage adjustment unit to the cleaning robot 100 through a power terminal.

Further, the charging station 200 may further include a docking communicator (not shown) transreceiving a docking signal to perform docking with the cleaning robot 100 with the cleaning robot 100.

The cleaning robot 100 may confirm an obstacle, such as furniture, office equipment, or a wall installed in the region to be cleaned, and a distance to the obstacle through an obstacle detector during cleaning, and may clean the region to be cleaned while autonomously changing the direction of the cleaning robot 100 by driving wheels according to results of the obstacle confirmation.

The cleaning robot 100 may communication with a virtual guard 300, and may restrict movement into an entry restriction region set by the virtual guard 300 based on a signal received from the virtual guard 300.

Here, the virtual guard 300 may be located at an entrance of the entry restriction region to restrict entry of the cleaning robot 100 and may serve as a virtual wall.

That is, the virtual guard 300 may transmit an entry restriction signal toward a connection channel between the current region to be cleaned and a specific region so as to prevent the cleaning robot 100 from entering the specific region. Further, the virtual guard 300 may transmit an approach restriction signal to prevent a change in the position of the virtual guard 300 due to an approach of the cleaning robot 100 to the virtual guard 300 and a collision of the cleaning robot 100 with the virtual guard 300, thus possibly restricting approach of the cleaning robot 100 while possibly restricting movement of the cleaning robot 100 to the entry restriction region. In such a manner, the virtual guard 300 may restrict movement of the cleaning robot 100 so that the cleaning robot 100 may move within the current region to be cleaned. Further, the virtual guard 300 may perform the function of a virtual door guiding movement of the cleaning robot 100 so that the cleaning robot 100 may move to another region after cleaning of the current cleaning region has been completed.

Hereinafter, such a cleaning robot 100 will be described in detail with reference to FIGS. 1A, 1B, 2, 3, 4A, 4B, 5A, and 5B.

Figure 1B:
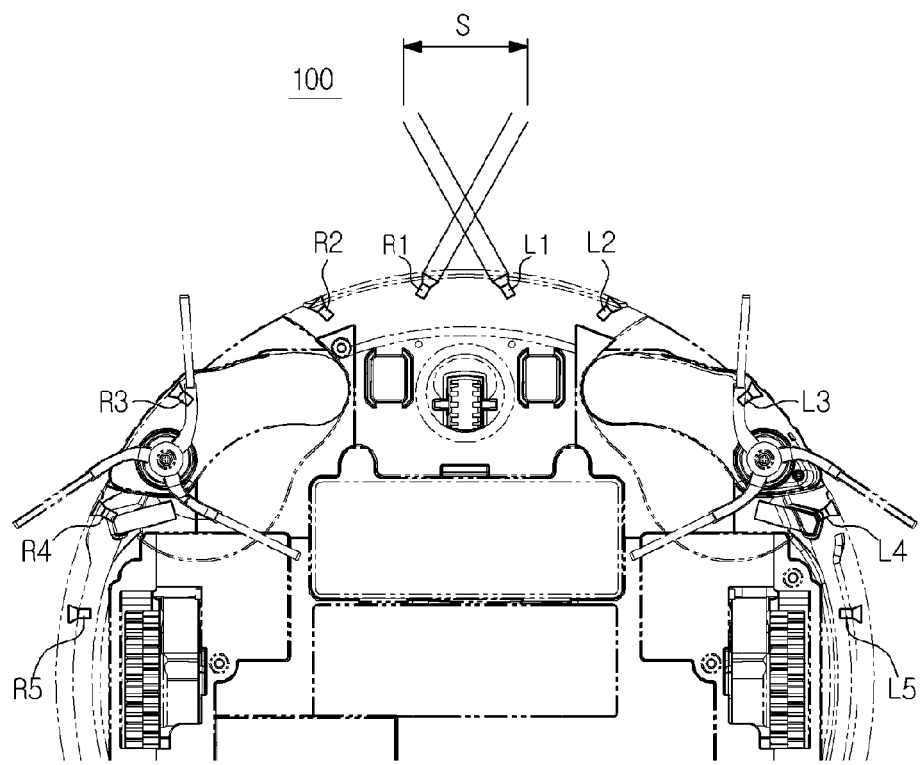
FIG. 1B is an exemplary view of an obstacle detector provided on a cleaning robot in accordance with one or more embodiments.
Figure 2:
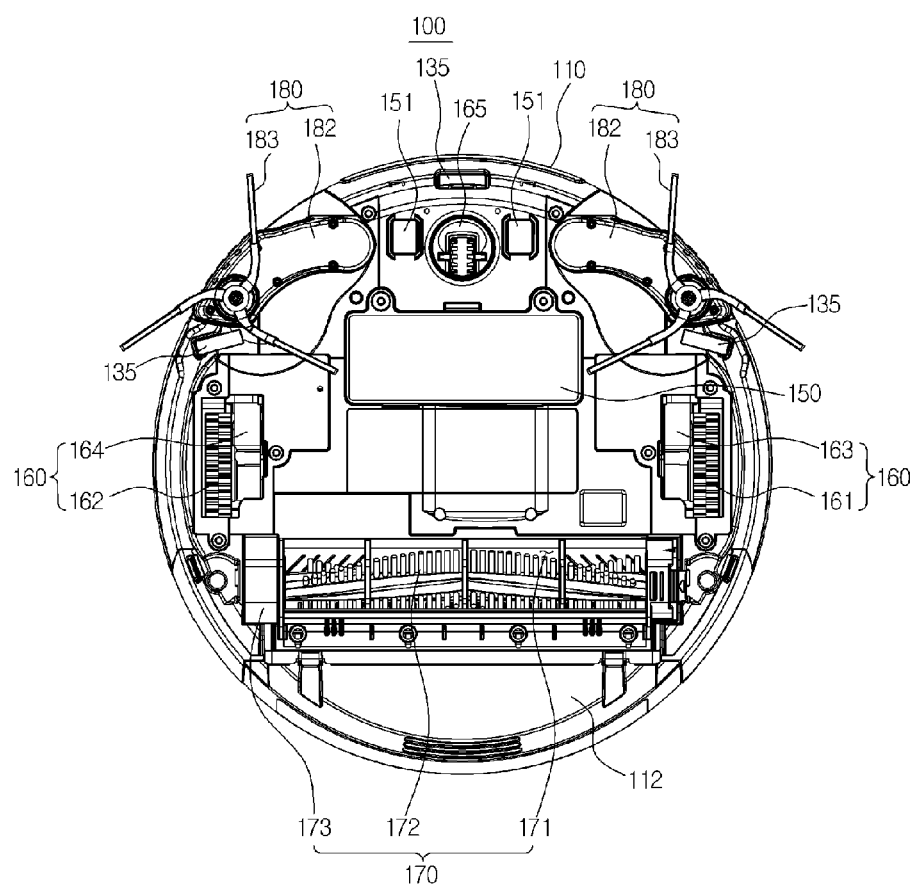
FIG. 2 is a bottom view of a cleaning robot in accordance with one or more embodiments.
Figure 3:
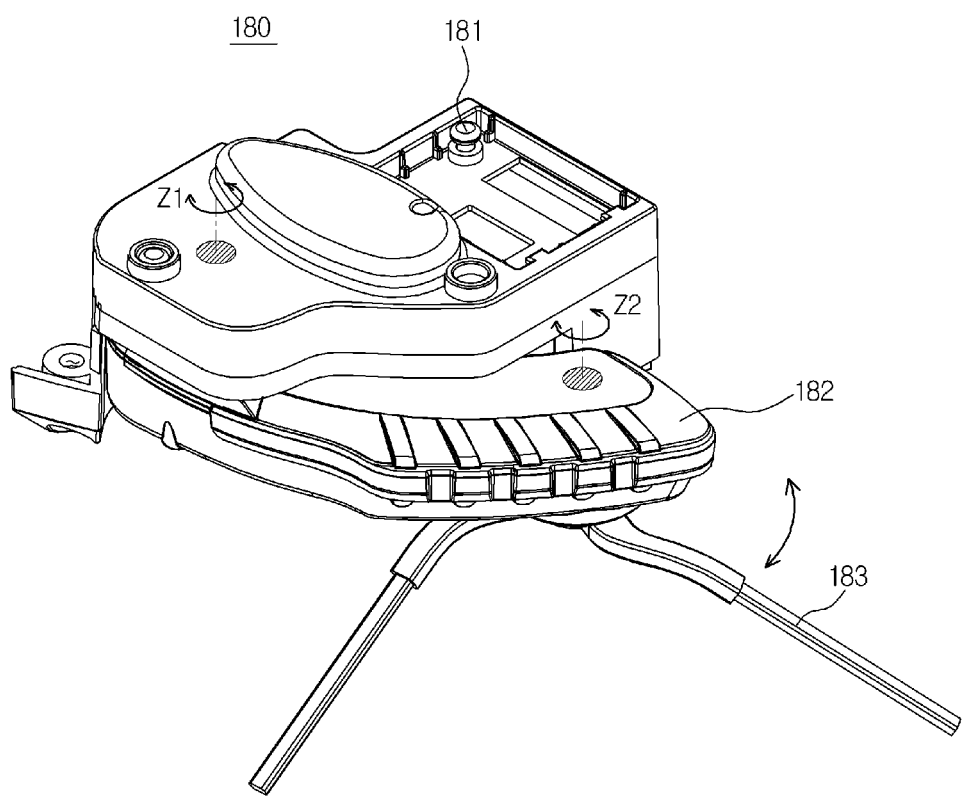
FIGS. 3, 4A, and 4B are exemplary detailed views of a sub-cleaning tool provided on a cleaning robot in accordance with one or more embodiments.

FIGS. 1A, 1B, and 2 are exemplary views of a cleaning robot in accordance with one or more embodiments.

Here, FIG. 1A is a perspective plan view of the cleaning robot in accordance with one or more embodiments, FIG. 1B is an exemplary view of an obstacle detector provided on a cleaning robot in accordance with one or more embodiments, and FIG. 2 is a bottom view of a cleaning robot in accordance with one or more embodiments.

As exemplarily shown in FIG. 1A, the cleaning robot 100 may include a main body 110 forming the external appearance of the cleaning robot 100, a bumper 111 mounted on the front surface of the main body 110 and relieving impact caused by collision with an obstacle, a user interface 120 mounted on the upper portion of the main body 110, receiving operation information and reservation information, and displaying the operation information, a detector 130 detecting information within the region to be cleaned, and a communicator 140 performing communication with external devices, such as the charging station 200 and the virtual guard 300.

Here, the detector 130 may be mounted on the main body 110, and may include an image detector 131 to detect position information of the cleaning robot 100 and an obstacle detector 132 to detect obstacles. The cleaning robot 100 may generate a map using such information.

As exemplarily shown in FIG. 1B, the obstacle detector 132 may include a plurality of obstacle sensors L1, L2, L3, L4, L5, R1, R2, R3, R4, and R5 mounted on the front surface and the left and right surfaces of the main body 110. The obstacle sensors L1, L2, L3, L4, L5, R1, R2, R3, R4, and R5 may be distance sensors which may measure a distance between the cleaning robot 100 and an obstacle as well as detect whether or not an obstacle is present.

Such an obstacle detector 132 may be mounted on the front surface and the left and right surfaces of the main body 110 and may detect obstacles located in front of and at the left and right sides of the cleaning robot 100.

The sensors L1, L2, R1, and R2 that may be located on the front surface of the main body 110 may detect an obstacle located in front of the main body 110, the sensors L3, L4, and L5 that may be located on the left surface of the main body 110 may detect an obstacle located at the left side of the main body 110, and the sensors R3, R4, and R5 that may be located on the right surface of the main body 110 may detect an obstacle located at the right side of the main body 110.

Two sensors L1 and R1 that may be located on the front surface of the main body 110 may be located at positions symmetrical to each other based on the center of the front surface of the main body 110. Here, the two sensors L1 and R1 may have a designated slope based on the center of the front surface of the main body 110 so that two obstacle detection signals may cross each other.

Thereby, when an obstacle located in front of the main body 110 is detected, a detection range S of the obstacle may be expanded and generation of a dead angle zone in an obstacle detection region located in front of the main body 110 may be prevented.

Some sensors L2, L3, L4, R2, R3, and R4 of the obstacle detector 32 may be located around sub-cleaning tools 180 so as to possibly prevent collision between obstacles and the sub-cleaning tools 180.

When an obstacle detection signal is input to at least one of the plural obstacle sensors L1, L2, L3, L4, L5, R1, R2, R3, R4, and R5, side arms may be protruded to clean a region adjacent to an obstacle. Here, at least one side arm may be protruded. If an obstacle located in front of the main body 110 is detected, both side arms may be protruded, and if an obstacle located at the side of the main body 110 is detected, a side arm in the detection direction of the obstacle may be protruded.

The plural obstacle sensors L1, L2, L3, L4, L5, R1, R2, R3, R4, and R5 of the obstacle detector 32 may give a command to protrude the side arms according to distances between the cleaning robot 100 and obstacles sensed by the respective sensors L1, L2, L3, L4, L5, R1, R2, R3, R4, and R5. These distances may vary according to the sensors L1, L2, L3, L4, L5, R1, R2, R3, R4, and R5.

For example, in case of the obstacle sensors L1, L2, R1, R2, when a distance to an obstacle is within, for example, about 170 mm, the side arms may be protruded. In case of the obstacle sensors L3 and R3, when a distance to an obstacle is within, for example, about 120 mm, the side arms may be protruded. In case of the obstacle sensors L4 and R4, when a distance to an obstacle is between, for example, about 25 mm and about 120 mm, the side arms may be protruded. In case of the obstacle sensors L5 and R5, when a distance to an obstacle is, for example, about 80 mm or less, the side arms may be protruded.

If a distance output value, i.e., an obstacle detection signal of the obstacle sensor of the obstacle detector 32, is a designated value or less, the side arm may not be protruded or may maintain an inserted state thereof. For example, in case of the obstacle sensors L3 and R3 located at portions of the cleaning robot 100 where the side arms are located, when a distance to an obstacle is, for example, about 25 mm or less, the side arms may not be protruded.

When, among the obstacle plural sensors L1, L2, L3, L4, L5, R1, R2, R3, R4, and R5, the obstacle sensors L4 and R4 detect an obstacle, the cleaning robot 100 may judge that there is a possibility of a jam the obstacle into the side arms and may control insertion of the side arms that may be provided on the sub-cleaning tools 180.

When, among the obstacle plural sensors L1, L2, L3, L4, L5, R1, R2, R3, R4, and R5, the obstacle sensors L3 and R3 detect an obstacle, the cleaning robot 100 may judge that a jam of the obstacle into the side arms has occurred and may control insertion of the side arms that may be provided on the sub-cleaning tools 180.

The bumper 111 may be further mounted on the rear surface of the main body 110.

The cleaning robot 100 may further include a dust collector 112 provided around the main cleaning tool 170 at the rear portion of the main body 110 and collecting foreign substances, such as dust, gathered through the main cleaning tool 170.

The user interface 120 may include an input unit 121 receiving, for example, cleaning reservation information, an operation mode, and a test mode, etc., and a display unit 122 displaying, for example, the cleaning reservation information, a charged state, a dust collection state, test results, the operation mode, etc. Operation modes may include, for example, a cleaning mode, a standby mode, and a docking mode, etc.

As exemplarily shown in FIG. 2, the cleaning robot 100 may include a power unit 150 that may supply power to the respective elements to drive the elements, a moving assembly 160 that may be installed on the lower portion of the main body 110 to move the main body 110, a main cleaning tool 170 that may be installed on the lower portion of the main body 110 to sweep or scatter dust on a floor and to suck the swept or scattered dust, and sub-cleaning tools 180 that may be installed on the lower portion of the main body 110 and protruding outward to sweep dust in regions differing from a region cleaned by the main cleaning tool 170 and to transfer the dust to the main cleaning tool 170.

The detector 130 may further include a fall detector 135 to prevent the main body 110 from falling. The fall detector 135 may include a plurality of cliff sensors, and the respective cliff sensors may be located, for example, among the lower portion of the front region of the main body 110, the side arms, and wheels 161 and 162.

The power unit 150 may include a battery electrically connected to the respective elements mounted on the main body 110 and supplying power to the respective elements to drive the elements.

Here, the battery may be a rechargeable secondary battery which may be electrically connected to the charging station 200 through two charging terminals 151, and may be charged by power supplied from the charging station 200.

The moving assembly 160 may include a pair of wheels 161 and 162 that may be installed at the left and right edges of the central portion of the main body 110 and that may move the cleaning robot 100 forward and backward and may rotate the cleaning robot 100, wheel motors 163 and 164 that may apply moving force to the respective wheels 161 and 162, and a caster wheel 165 that may be installed at the front portion of the main body 110 and that may rotate according to the state of the surface of a floor, on which the cleaning robot 100 moves, so that the angle of the caster wheel 165 may be changed.

The wheels 161 and 162 may be disposed symmetrically.

The caster wheel 165 may be used to stabilize the pose of the cleaning robot 100 and to prevent the cleaning robot 100 from falling, and may support the cleaning robot 100. The caster wheel 165 may be a roller-shaped or caster-shaped wheel.

The main cleaning tool 170 may include a main brush 172 that may be provided at a suction port 171 located at the lower portion of the main body 110 to sweep or scatter dust on the floor under the main body 110, and a first brush motor 173 that may rotate the main brush 172.

Here, the main brush 172 may include a roller mechanically connected to the first brush motor 173, and a brush member mounted on the outer circumferential surface of the roller. That is, as the roller of the main brush 172 is rotated by the first brush motor 173, the brush member mounted on the roller may be rotated.

The brush member of the main brush 172 may transfer dust on the floor to the suction port 171.

The cleaning robot 100 may collect foreign substances, such as dust, using suction force.

That is, the main cleaning tool 170 may further include a suction unit that may be provided within the main body 110 around the main brush 172 and that may generate suction force within the suction port 171.

The suction unit may include a blower. That is, the suction unit of the main cleaning tool 170 may guide dust, introduced into the suction port 171, to the dust collector 112 using blowing force of the blower and may adjust the blowing force under control of a controller.

The sub-cleaning tools 180 may serve to sweep dust on the floor in the front and side directions of the main body 110 and dust on the floor in a region, which the main brush 172 does not sweep, toward the suction port 171 to possibly improve cleaning efficiency. The sub-cleaning tools 180 may include a first sub-cleaning tool 180 that may be located at the left region of the front surface of the main body 110 and a second sub-cleaning tool 180 that may be located at the right region of the front surface of the main body 110. Hereinafter, such a sub-cleaning tool 180 will be described with reference to FIGS. 3, 4A and 4B.

The sub-cleaning tool 180 may include a body 181 mounted on the main body 110 so as to be separable from the main body 110, a side arm 182 rotatably mounted on the body 181, a side brush 183 rotatably mounted on the side arm 182, an arm motor 184 rotating the side arm 182, and a second brush motor 185 rotating the side brush 183.

Here, the arm motor 184 may be a stepper motor or a servomotor.

Since the sub-cleaning tool 180 may be mounted on the main body 110 so as to be separable from the main body 110, if the sub-cleaning tool 180 malfunctions and requires repair, the sub-cleaning tool 180 may be separated from the main body 110 without disassembly of the entirety of the main body 110.

The side arm 182 may be rotated about a first rotary axis Z1 and be protruded from or inserted into the main body 110, and the rotating angle of the side arm 182 may be restricted so that the side arm 182 may be protruded by a designated angle. Further, the protruded angle of the side arm 182 may be controlled according to, for example, a kind of obstacle detected, a position of the detected obstacle, and a distance between the cleaning robot 100 and the obstacle, etc. For example, if the distance between the cleaning robot 100 and the obstacle is a designated value or more, the protruded angle of the side arm 182 may be increased to effectively clean a region around the obstacle. The side brush 183 may be rotated about a second rotary shaft Z2 and may sweep dust on the floor toward the suction port 171.

Figure 4A:
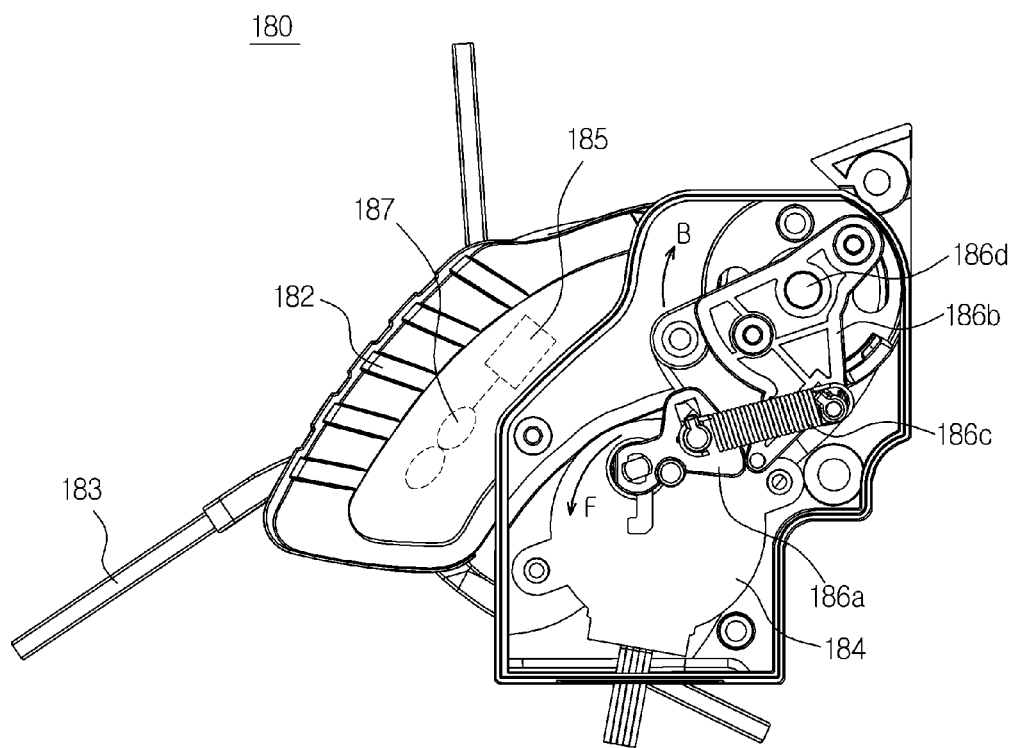
Figure 4B:
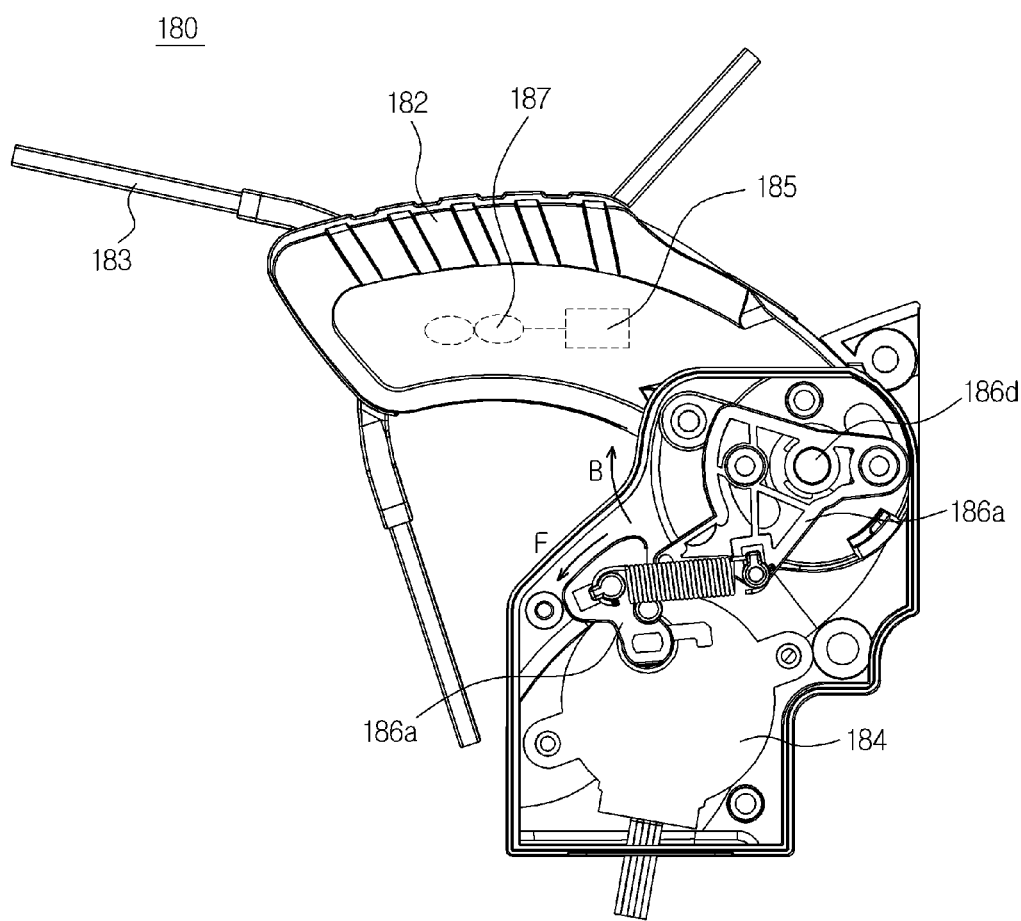

Now, the structure of such a sub-cleaning tool 180 will be described with reference to FIGS. 4A and 4B.

The sub-cleaning tool 180 may further include a cam 186a, a lever 186b, and an elastic member 186c that may transmit rotating force of the arm motor 184 to the side arm 182.

The cam 186a may be mounted on the arm motor 184. The arm motor 184 may transfer driving force to the cam 186a and may rotate the cam 186a in the clockwise or counterclockwise direction.

A hole into which an arm shaft 186d may be inserted may be formed on the lever 186b. A through hole corresponding to the hole formed on the lever 186b may be formed on the body 181. That is, the lever 186b may be rotatably mounted on the body 181 by the arm shaft 186d passing through the hole of the lever 186b and the through hole of the body 181.

The elastic member 186c may connect the cam 186a and the lever 186b. The elastic member 186c may be mounted at one side of the cam 186a and one side of the lever 186b, and may transfer elastic force to the lever 186b according to movement of the cam 186a and the side arm 182.

That is, the elastic member 186c may be tensioned by rotation of the side arm 182 due to rotation of the cam 186a or external force applied to the side arm 182. When external force applied to the side arm 182 is eliminated, the side arm 182 may return to the original position thereof by elastic force of the elastic member 186c.

The sub-cleaning tool 180 may further include a gear unit 187 formed on the second rotary axis of the second brush motor 185 and transmitting rotating force of the second brush motor 185 to the side brush 183.

Hereinafter, protrusion and insertion of the sub-cleaning tool 180 will be briefly described.

When the arm motor 184 is rotated in a regular direction under the condition that the side arm 182 has been inserted into the body 181, the cam 186a may be rotated in the counterclockwise direction (direction F) and, at this time, an interval between one side of the lever 186b and one side of the cam 186a at which the elastic member 186c is mounted may be increased and the elastic member 186c may be tensioned. Then, the other side of the lever 186b may be rotated about the arm shaft 186d in the clockwise direction (direction B) by elastic force of the tensioned elastic member 186c.

As the lever 186b is rotated in the clockwise direction, the side arm 182 combined with the lever 186b may be rotated in the clockwise direction (direction B) and may be protruded from the main body 110.

This will be described with reference to FIGS. 5A and 5B.

Figure 5A:
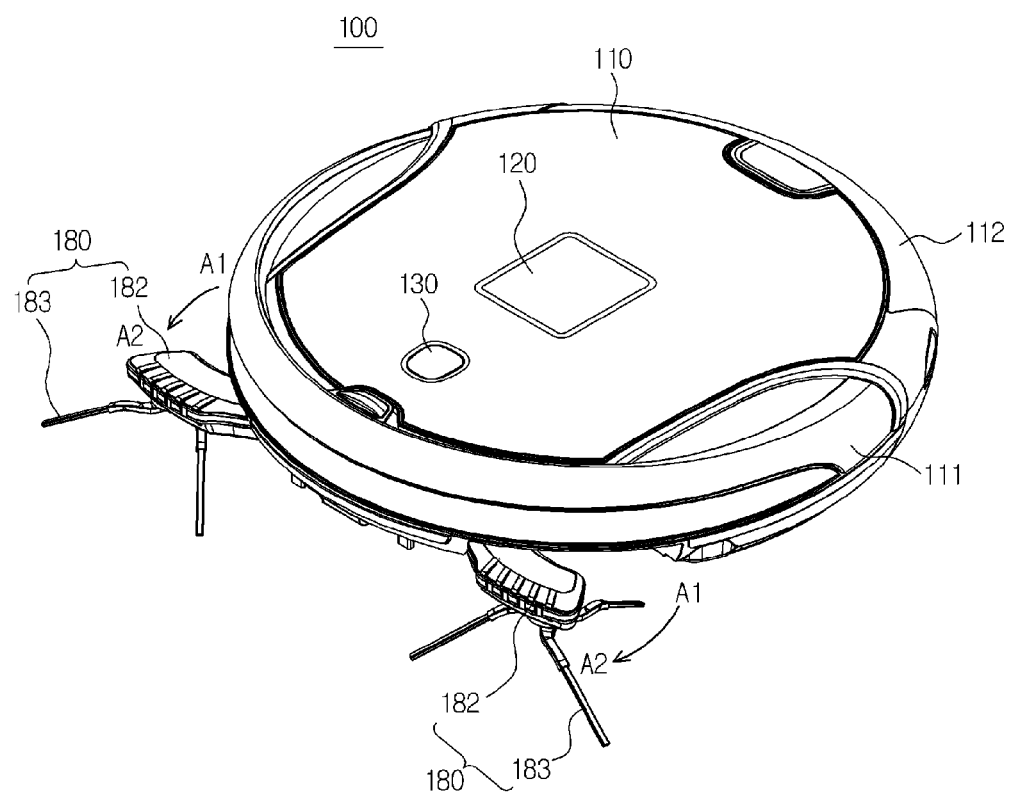
FIGS. 5A and 5B are exemplary detailed views of sub-cleaning tools in a protruded state provided on a cleaning robot in accordance with one or more embodiments.
Figure 5B:
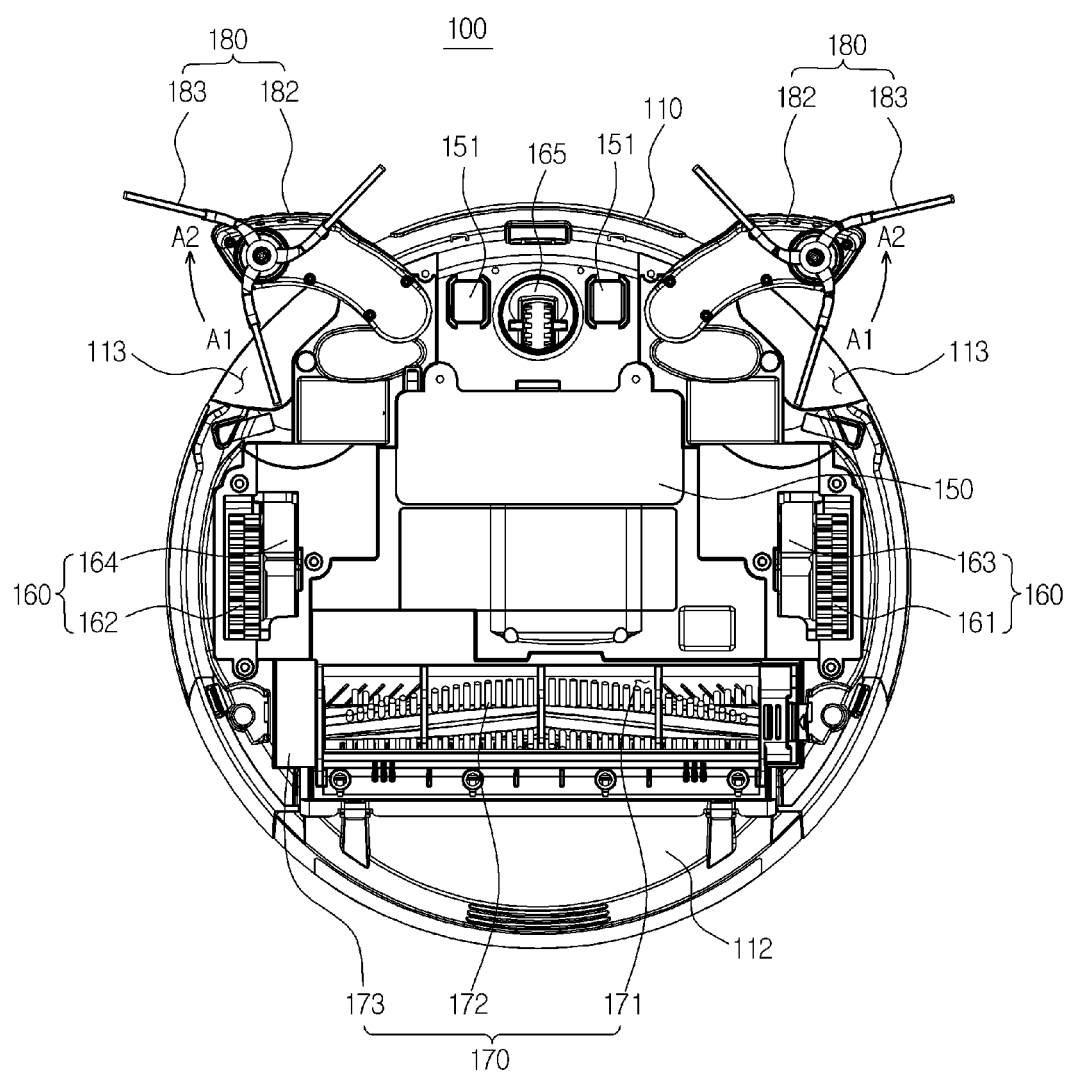

FIG. 5A is an exemplary plan view of the sub-cleaning tools 180 protruded from receiving parts 113 of the main body 110, i.e., in a protruded state, and FIG. 5B is an exemplary bottom illustrating of the sub-cleaning tools 180 in the protruded state.

When the arm motor 184 is rotated in the reverse direction under the condition that the side arm 182 has been protruded from the body 181, the cam 186a may be rotated in the clockwise direction and, at this time, the interval between one side of the lever 186b and one side of the cam 186a at which the elastic member 186c may be mounted may be decreased and the elastic member 186c may be contracted. Then, the other side of the lever 186b may be rotated about the arm shaft 186d in the counterclockwise direction by elastic force of the contracted elastic member 186c.

As the lever 186b is rotated in the counterclockwise direction, the side arm 182 may be rotated in the counterclockwise direction and may be inserted into the receiving part 113 of the main body 110.

By protruding the side arm 182 provided on the sub-cleaning tool 180 from the main body 110, in such a manner, the rotary shaft of the side brush 183 may be extended from the inside of the main body 110 to the outside of the main body 110. Then, the side brush 183 which has been rotated within the main body 110 may be rotated at the outside of the main body 110 and thus, a cleaning range of the cleaning robot 100 may be expanded from a first range A1 to a second range A2.

The cleaning robot 100 may further include a switch 189 to detect the protruding or inserted state of the side arm 182 provided on the sub-cleaning tool 180. The switch 189 will be described with reference to FIGS. 6A and 6B.

Figure 6A:
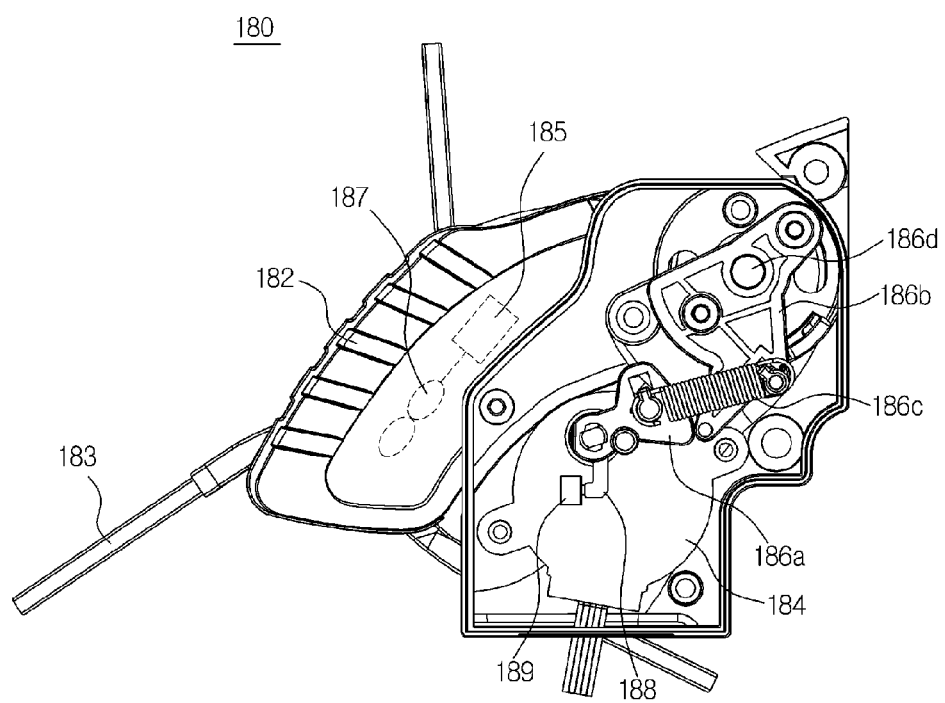
FIGS. 6A and 6B are exemplary detailed views of a sub-cleaning tool in a protruded state provided on a cleaning robot in accordance with one or more embodiments.
Figure 6B:
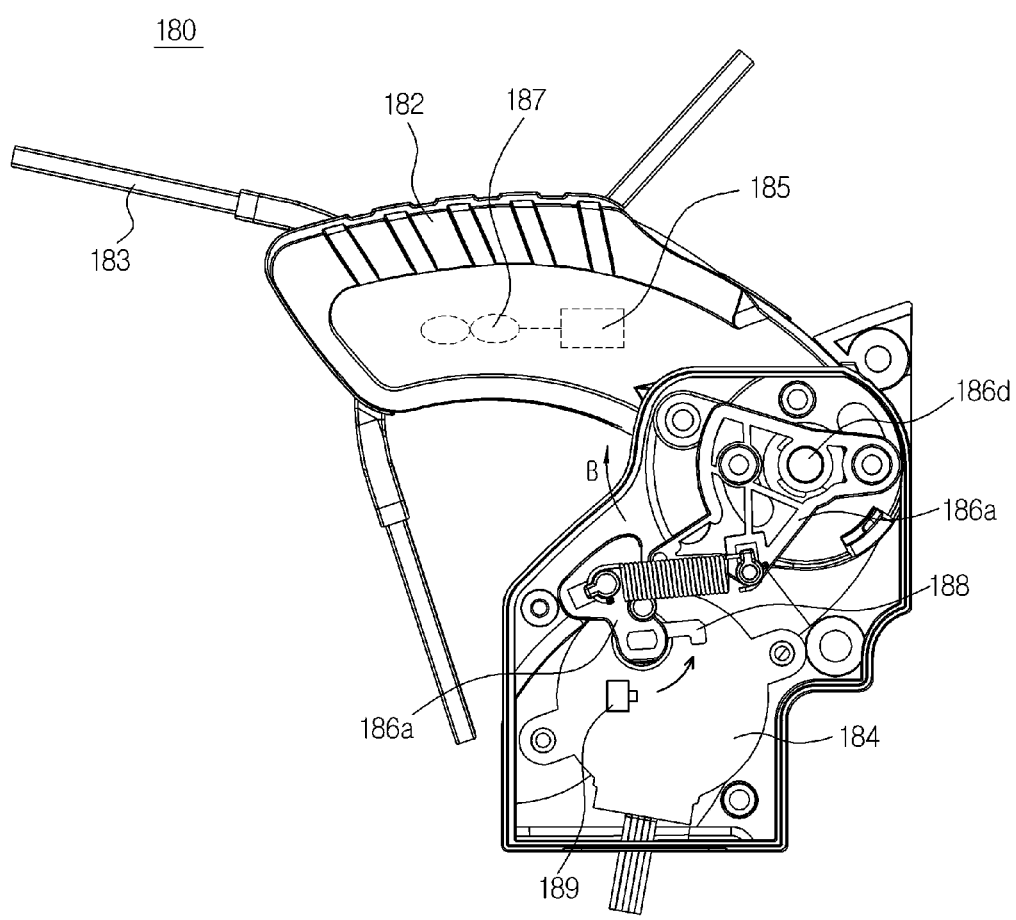

FIGS. 6A and 6B are exemplary views of a cleaning robot in accordance with one or more embodiments.

The sub-cleaning tool 180 of the cleaning robot in accordance with one or more embodiments may further include a contact member 188 extended outward from the cam 186a, and a switch 189 that may be turned on and off by contact with and separation from the contact member 188 and that may transmit on and off signals to the controller.

When the side arm 182 is inserted into the main body 110, as exemplarily shown in FIG. 6A, the contact member 188 may contact the switch 189 and thus, the switch 189 may be turned on, and, when the side arm 182 is protruded from the main body 110, as exemplarily shown in FIG. 6B, the contact member 188 may move together with movement of the cam 186a and the contact member 188 may be separated from the switch 189 and thus, the switch 189 may be turned off.

FIG. 7A is a control block diagram of a cleaning robot in accordance with one or more embodiments. The cleaning robot in accordance with one or more embodiments may include a detector 130, a communicator 140, a controller 191, a storage 192, and a driver 193.

The user interface 120 may include an input unit 121 receiving, for example, cleaning reservation information, an operation mode, and a test mode, etc., and a display unit 122 displaying, for example, cleaning reservation information, charged state information, dust collection state, test results information, the operation mode, etc.

Here, operation modes may include, for example, a cleaning mode, a standby mode, and a docking mode.

The detector 130 may include an image detector 131 to detect the image of a region to be cleaned, and an obstacle detector 132 to detect obstacles within the region to be cleaned.

The image detector 131 may include an image sensor. An image acquired by the image detector 131 may be used to judge the current position of the cleaning robot and to build a map.

The obstacle detector 131 may include, for example, at least one of at least one kind of a contact sensor, a proximity sensor, an ultrasound sensor, an image sensor, a laser scanner, and an infrared sensor, etc.

For example, if the obstacle detector 131 includes an ultrasound sensor, the ultrasound sensor may generate ultrasonic waves based on a command from the controller 191 during operation of the ultrasound sensor, may receive reflected ultrasonic waves after generation of ultrasonic waves, and may transmit a detection signal of the received ultrasonic waves to the controller 191.

Further, if the obstacle detector 131 includes an image sensor, the image sensor may acquire a surrounding image during operation of the image sensor, may process the acquired image, and may transmit the processed image to the controller 191.

If an image is acquired to detect an obstacle in this way, the obstacle may be detected using an image acquired by the image detector 131 without a separate image sensor.

The obstacle detection signal output from the obstacle detector 132 may be a distance detection signal representing a distance to an obstacle.

The detector 130 may further include an angle detector 133 detecting the rotating angle of the arm motor 184 provided on each of the plural sub-cleaning tools 180, and a pose detector 134 detecting change of the pose and position of the main body 110.

If the arm motor 184 is a stepper motor, the angle detector 133 may count the number of pulses applied to the stepper motor.

If the arm motor 184 is a servomotor, the angle detector 133 may include a first encoder detecting the RPM of the servomotor in a regular direction and a second encoder to detect the RPM of the servomotor in the reverse direction, as encoders to detect the RPM of the servomotor.

The pose detector 134 may include a gyro sensor detecting movement or rotation of the main body 110.

The pose detector 134 may detect information to judge whether or not an obstacle is jammed into the side arm, and may use the image detector 131 detecting an image or employ an acceleration sensor detecting the acceleration of the main body 110.

That is, movement of the main body 110 may be detected using the image detected by the image detector 131, or be detected based on the acceleration detected by the acceleration sensor.

The communicator 140 may include a first communicator 141 that may perform communication with a docking communicator of the charging station 200 to detect the direction of the charging station 200 and a distance to the charging station 200 when docking with the charging station 200 is performed, and a second communicator 142 that may perform communication with at least one virtual guard 300.

The first communicator 141 may include, for example, at least one of an infrared sensor and an ultrasound sensor, etc., and the second communicator 142 may include, for example, at least one of an infrared sensor, a visible light sensor, an ultrasound sensor, a radiofrequency (RF) sensor, and a laser sensor, etc.

The controller 191 may control driving of the wheel motors 163 and 164 and driving of the first brush motor 173 and the second brush motor 185, when a cleaning command is input through the input unit 121, and may maintain driving of the first brush motor 173, may control driving of the second brush motor 185 at a low speed, and may control driving of the wheel motors 163 and 164 so as to perform docking with the charging station 200, such as when cleaning has been completed.

The controller 191 may respectively control driving of the wheel motors 163 and 164 so that the cleaning robot 100 may travel in a predetermined traveling pattern or a random traveling pattern during control of traveling of the cleaning robot 100.

The controller 191 may perform protrusion and insertion of the side arms 182 at least once, when the cleaning robot starts a cleaning mode in a standby state.

That is, a test mode may be executed to judge abnormality of the side arms 182 prior to performing cleaning, when the controller 191 judges that the current time is a cleaning time. The test mode may be performed automatically or be performed upon reception of a test mode input signal from a user. The controller 191 may control driving of the arm motors 184 so that the side arms 182 may be protruded from the main body 110 when the test mode input signal is input through the input unit 121 under the condition that the side arms 182 are inserted into the main body 110, and may control driving of the arm motors 184 so that the side arms 182 may be inserted into the main body 110 when the test mode input signal is input through the input unit 121 under the condition that the side arms 182 are protruded from the main body 110. The user may directly confirm the protruded and inserted states of the side arms 182.

The controller 191 may control driving of the arm motors 184 so that the side arms 182 in the inserted state are protruded from the main body 110 or the side arms 182 in the protruded state are inserted into the main body 110, may judge abnormality of the side arms 182 by judging whether or not digital signals are generated during driving of the arm motors 184, and may control driving of the display unit 122 so that the display unit 122 displays results of the judgment.

Further, the controller 191 may rotate the arm motors 184 in different directions by designated angles up to a target angle during control of protrusion and insertion of the side arms 182 for testing.

For example, the controller 191 may rotate the arm motors 184 in a regular direction by designated angles up to a first target angle during protrusion of the side arms 182, and may rotate the arm motors 184 in the reverse direction by designated angles up to a second target angle during insertion of the side arms 182.

When performing the test mode prior to start of the cleaning mode in the standby state, if a user commands the cleaning robot to select the cleaning mode or return to the charging station 200, the cleaning robot may stop the test mode in which protrusion and insertion of the side arms 182 are repeated and then start cleaning.

The controller 191 may judge whether or not an obstacle is present in front of and at the left and right of the main body 110 based on obstacle detection signals transmitted from the obstacle detector 132 during traveling of the cleaning robot for cleaning, may control insertion of the side arms 182 of the sub-cleaning tools 180 upon judging that no obstacle is present, and may maintain rotation of the main brush 172 of the main cleaning unit 170 and the side brushes 183 of the sub-cleaning units 180.

The controller 191 may control protrusion of the side arms 182 when the obstacle detection signal is input from at least one of the plural sensors of the obstacle detector 132.

Upon judging that an obstacle is present during traveling of the cleaning robot for cleaning, the controller 191 may cause the main body 110 to trace the obstacle to clean a region adjacent to the obstacle. If the obstacle is located at the left or right of the main body 110, the main body 110 may travel while tracing the obstacle, and if the obstacle is located in front of the main body 110, the controller 191 may determine a direction in which the main body 110 traces the obstacle.

A rotation direction may be determined first and then rotation of the main body 110 in the determined rotation direction may be controlled. At this time, driving of the arm motors 184 may be controlled so that the side arm 182 located at a position corresponding to the obstacle may be protruded. For example, if it is judged that a wall is present at the left of the main body 110, the controller 191 may control rotation of the left arm motor 184 in the regular direction so that the left side arm 182 may be protruded, and if it is judged that a wall is present at the right of the main body 110, the controller 191 may control rotation of the right arm motor 184 in the regular direction so that the right side arm 182 may be protruded. Further, the controller 191 may additionally control driving of the arm motors 184 so that the side arm 182 provided at a position corresponding to the rotation direction of the main body 110 may be inserted into the main body 110. For example, the controller 191 may control insertion of the left side arm 182 into the main body 110 when the main body 110 is rotated in the leftward direction, and may control insertion of the right side arm 182 into the main body 110 when the main body 110 is rotated in the rightward direction. This may serve to possibly avoid collision with a potential obstacle during rotation of the main body 110.

The controller 191 may control the rotational speed of the second brush motors 185 so that the rotational speed of the side brush 183 provided in the direction of the obstacle may be increased during traveling of the cleaning robot for obstacle tracing. Further, the controller 191 may increase the rotational speed of the main brush 172.

Further, if the suction unit is provided, the controller 191 may increase the rotational speed of the blower so as to increase suction force.

The controller 191 may protrude both the left and right side arms 182 during obstacle tracing.

When rotation of the main body 110 is determined during traveling of the cleaning robot for obstacle tracing, the controller 191 may control driving of the arm motors 184 so that the side arm 182 located in the determined rotation direction may be inserted into the main body 110.

For example, the controller 191 may control rotation of the left arm motor 184 in the reverse direction so that the left side arm 182 may be inserted into the main body if it is determined that the main body 110 is rotated in the leftward direction, and may control rotation of the right arm motor 184 in the reverse direction so that the right side arm 182 may be inserted into the main body if it is determined that the main body 110 is rotated in the rightward direction.

If a distance to an obstacle is a designated value or more when the main body 110 is rotated under the condition that the obstacle has been detected, the controller 191 may control insertion of the side arms 182 while maintaining traveling of the main body 110. In this case, the controller 191 may decrease the rotational speed of the main body 110. If the distance to the obstacle is below the designated value, the controller 191 may stop rotation of the main body 110 and then may control insertion of the side arms 182, and may control re-rotation of the main body 110 when insertion of the side arms 182 has been completed. For example, when the main body 110 is rotated, if a distance to an obstacle detected by a distance sensor located in the rotation direction is below a designated value (for example, about 60 mm), the controller 191 may stop rotation of the main body 110 and then may rotate the main body 110 after insertion of the side arms 182 into the main body 110.

When the second communicator 142 receives a signal transmitted from the virtual guard 300, the controller 191 may control rotation of the arm motors 184 in the reverse direction so that the side arms 182 may be inserted into the main body 110, and may control driving of the wheel motors so that the main body 110 moves away from the virtual guard 300.

When the controller 191 judges that cleaning has been completed, the controller 191 may maintain the rotational speed of the main brush 172 provided on the main cleaning tool 170 and may decrease the rotational speed of the side brushes 183 of the sub-cleaning tools 180, may control driving of the left and right arm motors 184 so that the left and right side arms 182 may be inserted into the main body 110, and may control driving of the wheel motors 163 and 164 so that docking with the charging station 200 may be performed.

The controller 191 may judge whether or not the pose and position of the main body 110 are changed based on pose information detected by the pose detector 134 during traveling, may compare the judged pose and position change information of the main body 110 with pose and position change information corresponding to traveling, and may judge whether or not jam of an obstacle into the sub-cleaning tool 180 occurs based on results of comparison.

The pose and position change information of the main body 110 may be target moving information applied to the wheel motors during control of movement of the main body 110, and the pose and position change information detected by the pose detector 134 may be actual moving information of the main body 110.

If the target moving information and the actual moving information are different, the controller 191 may judge that a jam of the obstacle into the sub-cleaning tool 180 may have occurred, and may control driving of the wheel motors 163 and 164 so that the current pose and position of the main body 110 may be changed and may control driving of the arm motors 184 so that the side arms 182 may be inserted into the main body 110.

When obstacle detection signals from the left and right sensors L3 and R3 are received, the controller 191 may judge that a jam the obstacle into the side arms 182 of the sub-cleaning tools 180 may have occurred and may control output of an alarm.

When obstacle detection signals from the left and right sensors L4 and R4 are received, the controller 191 may judge that there is a possibility of a jam of an obstacle into a space between the side arms 182 of the sub-cleaning tools 180 and the main body 110, and may control driving of the arm motors 184 so that the side arms 182 may be inserted into the main body 110 prior to generation of a jam or may control driving of the wheel motors 163 and 164 so that the current pose and position of the main body 110 may be changed.

The controller 191 may count the number of protrusions of the side arms 182 from the main body 110 within a predetermined region or for a designated time, and may control rotation of the side brushes 183 while maintaining insertion of the side arms 182 into the main body 110 for a regular time if the counted number is a predetermined number or more.

Further, the controller 191 may count the number of protrusions of the side arms 182 from the main body 110 for a reference time, and may control insertion of the side arms 182 into the main body 110 if the counted number is a predetermined number or more.

Further, the controller 191 may maintain insertion of the side arms 182 into the main body 110 by counting the number of insertions of the side arms 182.

When obstacle tracing has been completed, the controller 191 may maintain the protruded state of the side arms 182 for a predetermined time. Thereby, re-protrusion of the side arms 182 after insertion of the side arms 182 may be prevented when the cleaning robot 100 traces different obstacles adjacent to each other.

That is, after traveling for cleaning while protruding the side arms 182 to a first obstacle, the side arms 182 may not be inserted into the main body 110 just after tracing of the first obstacle has been completed, but the cleaning robot 100 may travel in the protruded state of the side arms 182 for a designated time (for example, about 1~3 seconds) after tracing of the first obstacle. Therefore, when a second obstacle is detected within the designated time, the cleaning robot 100 may perform cleaning while tracing the second obstacle without re-protrusion of the side arms 182. For example, the cleaning robot 100 may travel in the protruded state of the side arms 182 for about 1.5 seconds after tracing of the first obstacle and, if the second obstacle is present within a range of about 50 cm from the cleaning robot 100 for such a time, i.e., about 1.5 seconds, the cleaning robot 100 may clean a region around the second obstacle without re-protrusion of the side arms 182.

The controller 191 may control rotation of the arm motors 184 by predetermined angles during control of protrusion or insertion of the side arms 183, may count the RPM of the arm motors 184 by the predetermined angles, and may stop driving of the arm motors 184 by comparing the counted angle with a target angle. Here, the RPM of the arm motors 184 by the predetermined angles may be the number of pulses.

The storage 192 may store a first target angle and a second target angle, and may store the predetermined angle by which the arm motors 184 are rotated during protrusion or insertion of the side arms 182. Here, the predetermined angle may correspond to one pulse applied to the arm motors 184.

The storage 192 may store first target angles according to distances from an obstacle.

In more detail, since the side brushes 183 of the cleaning robot 100 should contact an obstacle so as to clean a boundary with the obstacle, the side arms 182 should be protruded by a distance between the main body 110 and the obstacle. Therefore, the protrusion length of the side arms 182 protruded outward from the main body 110 may be determined corresponding to the distance to the obstacle and, in order to protrude the side arms 182 to the determined protrusion length, the side arms 183 may be rotated by an angle corresponding to the protrusion length and thus be protruded from the main body 110.

The first target angle and the second target angle may be determined according to the distance between the main body and the obstacle. The first target angle and the second target angle may be adjusted based on the distance between the main body and the obstacle whenever the obstacle is detected, and thus may be stored.

By controlling the protrusion length of the side arms 182 of the sub-cleaning tools 180 in such a manner, the cleaning range may be adjusted.

The storage 192 may store the rotational speed of the main brush 172, the rotational speed of the side brushes 183, and the rotational speed of the blower in a general region where no obstacle is present, and may store the rotational speed of the main brush 172, the rotational speed of the side brushes 183, and the rotational speed of the blower in an obstacle region where an obstacle is present.

The rotational speed of each brush in the general region may be lower than the rotational speed of each brush in the obstacle region.

The driver 193 may drive at least one of the plural motors based on a command from the controller 191, and may include a first driver 193a driving the wheel motors 163 and 164, a second driver 193b driving the first brush motor 173, a third driver 193c driving the arm motors 184, and a fourth driver 193d driving the second brush motors 185.

The respective drivers 193c, 193b, 193c, and 193d may rotate the wheel motors 163 and 163, the first brush motor 173, the arm motors 184, and the second brush motors 185 in a regular direction or the reverse direction.

Figure 7B:
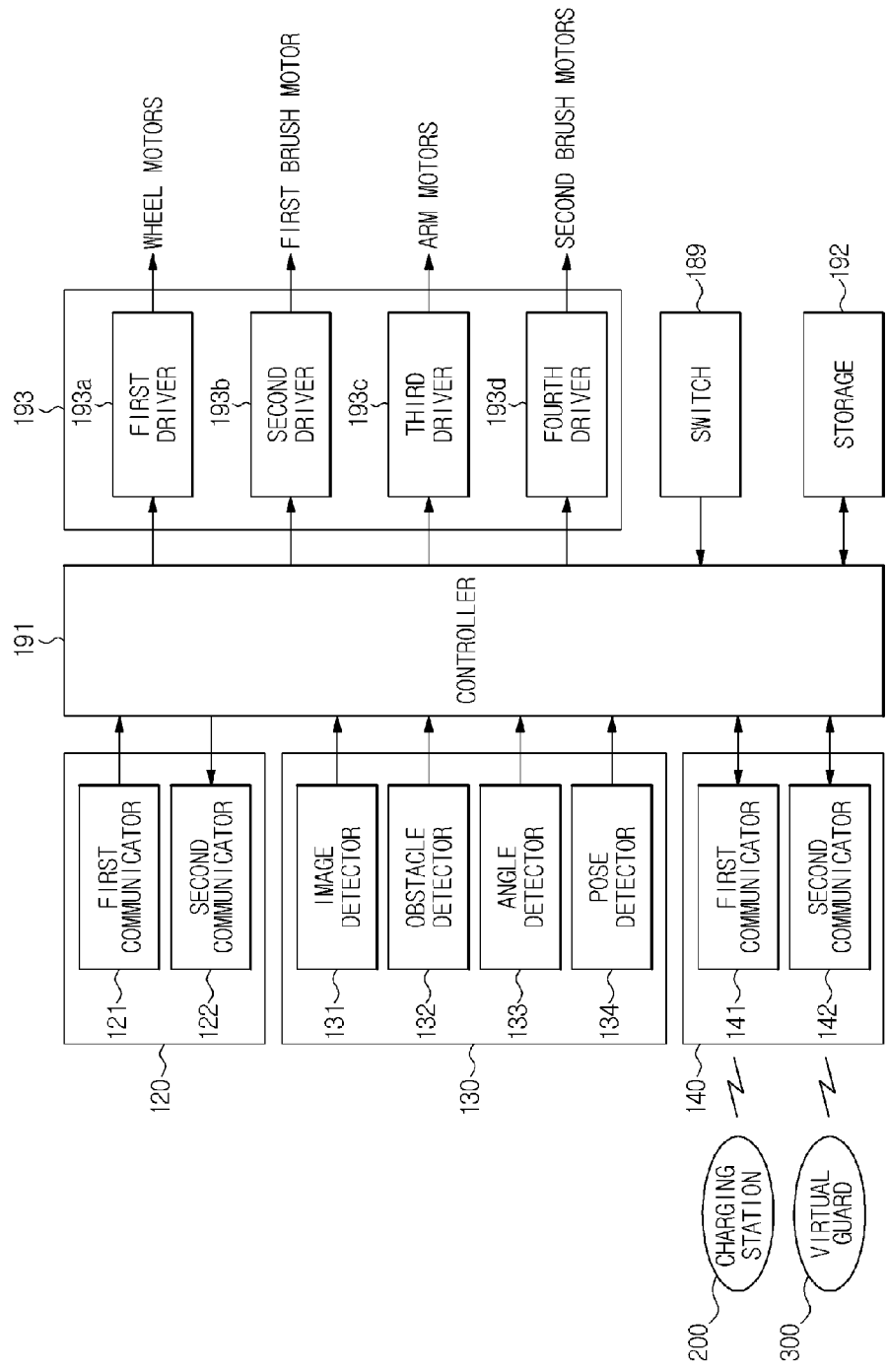
FIG. 7B is a control block diagram of a cleaning robot in accordance with one or more embodiments.

FIG. 7B is a control block diagram of a cleaning robot in accordance with another embodiment of the present invention. The cleaning robot in accordance with this embodiment may include a detector 130, a communicator 140, a controller 191, a storage 192, and a driver 193, and further switches 189.

The detector 130, the communicator 140, the controller 191, the storage 192, and the driver 193 of the cleaning robot in accordance with one or more embodiments are the same as the detector 130, the communicator 140, the controller 191, the storage 192, and the driver 193 of the cleaning robot as described above with respect to FIG. 7A, and a detailed description thereof will thus be omitted.

Further, a configuration of controlling protrusion and insertion of sub-cleaning tools based on results of obstacle detection and results of communication with external devices and a configuration of controlling protrusion and insertion of the sub-cleaning tools after cleaning has been completed in the cleaning robot in accordance with this embodiment are the same as those in the cleaning robot as described above with respect to FIG. 7A, and a detailed description thereof will thus be omitted.

Hereinafter, additional operation of the controller 191 will be described.

The controller 191 may judge insertion and protrusion of the side arms 182 based on an on/off signal transmitted from the switches 189.

If the on signal is input from the switch 189 under the condition that a command to protrude the side arm 182 from the main body 110 is input, or if the off signal is input from the switch 189 under the condition that a command to insert the side arm 182 into the main body 110 is input, the controller 191 may judge an abnormality of the sub-cleaning tool 180 and may control driving of the display unit 122 so as to output an abnormality of the sub-cleaning tool 180.

Figure 8:
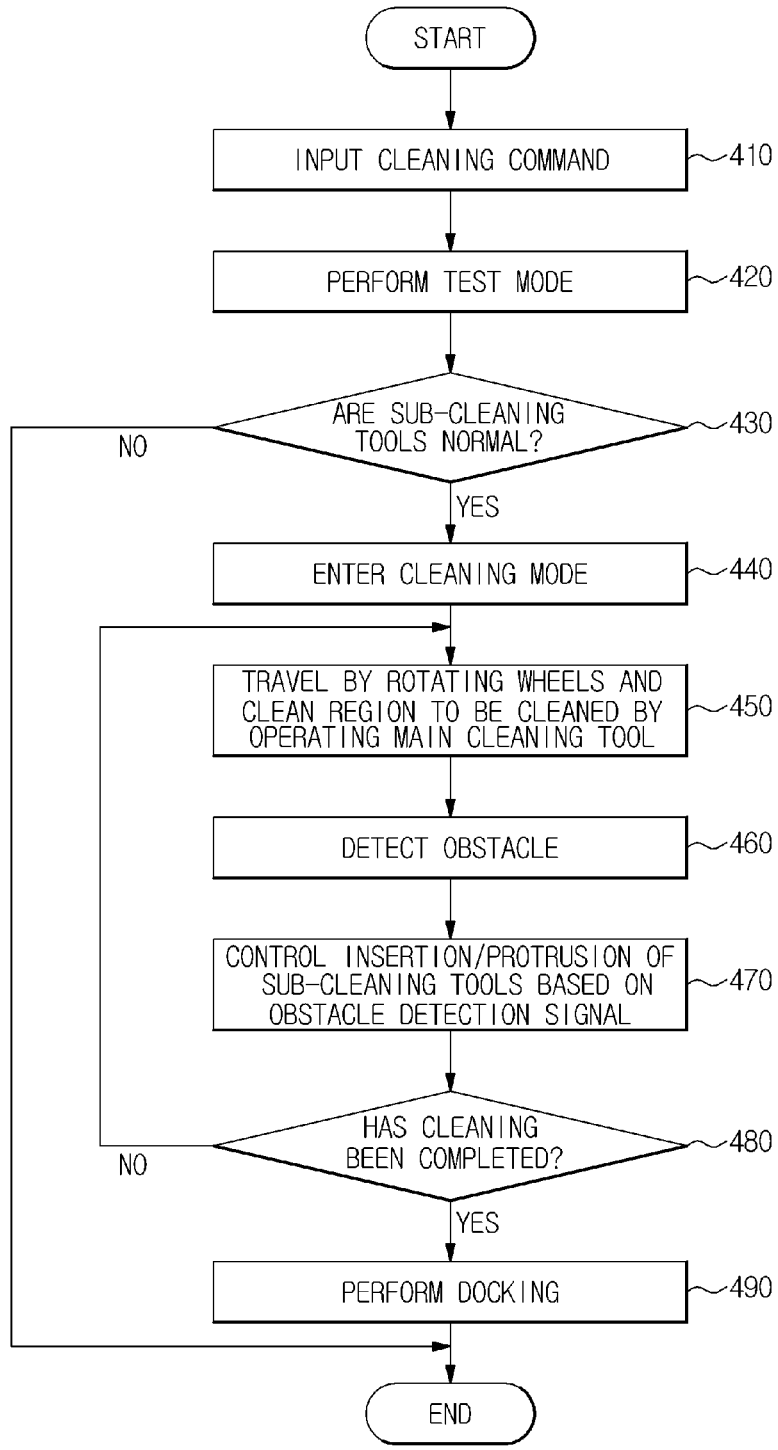
FIG. 8 is a flowchart illustrating a control method of a cleaning robot in accordance with one or more embodiments.

FIG. 8 is a flowchart illustrating a control method of a cleaning robot in accordance with one or more embodiments.

When a cleaning reservation time arrives or a cleaning command is input by a user (Operation 410), the cleaning robot may perform a test mode to judge whether or not the sub-cleaning tools 180 may be normally driven (Operation 420), and judges whether or not the sub-cleaning tools 180 are normal as results of the test mode (Operation 430).

The cleaning robot may enter a cleaning mode upon judging that the sub-cleaning tools 180 are normal as the results of the test mode (Operation 440). On the other hand, the cleaning robot may terminate the cleaning mode upon judging that the sub-cleaning tools 180 are abnormal, and may output abnormality information of the sub-cleaning tools 180 to the display unit 122.

When the cleaning robot enters the cleaning mode, the cleaning robot may travel about a region to be cleaned by rotating the wheels 161 and 162 through driving of the wheel motors 163 and 164, and may clean the region to be cleaned by operating the main cleaning tool 170 (Operation 450).

In more detail, when the cleaning robot enters the cleaning mode, the cleaning robot may drive the wheel motors 163 and 164 so as to rotate the wheels 161 and 162, and may drive the first brush motor 173 of the main cleaning tool 170 so as to rotate the main brush 172. Further, if a suction unit is provided in the cleaning robot, the cleaning robot may drive a fan motor (not shown) of a blower so as to suck dust from the outside.

Further, the cleaning robot may control operation of the sub-cleaning tools 180. Here, the cleaning robot may detect an obstacle using the obstacle detector 132 (Operation 460), and may control insertion or protrusion of the side arms 182 provided on the sub-cleaning tools 180 based on an obstacle detection signal detected by the obstacle detector 132. The obstacle detection signal may be a distance signal to the obstacle.

Thereafter, the cleaning robot may judge whether or not cleaning has been completed (Operation 480). Upon judging that cleaning has been completed, the cleaning robot may insert the side arms 182 into the main body 110 and then may perform docking with the charging station 200 while performing communication with the charging station 200 (Operation 490).

Now, with reference to FIGS. 9 to 20, control of performance of the test mode, control of the sub-cleaning tools based on an obstacle detection signal, and control of the sub-cleaning tools when cleaning has been completed will be described in more detail.

Figure 9:
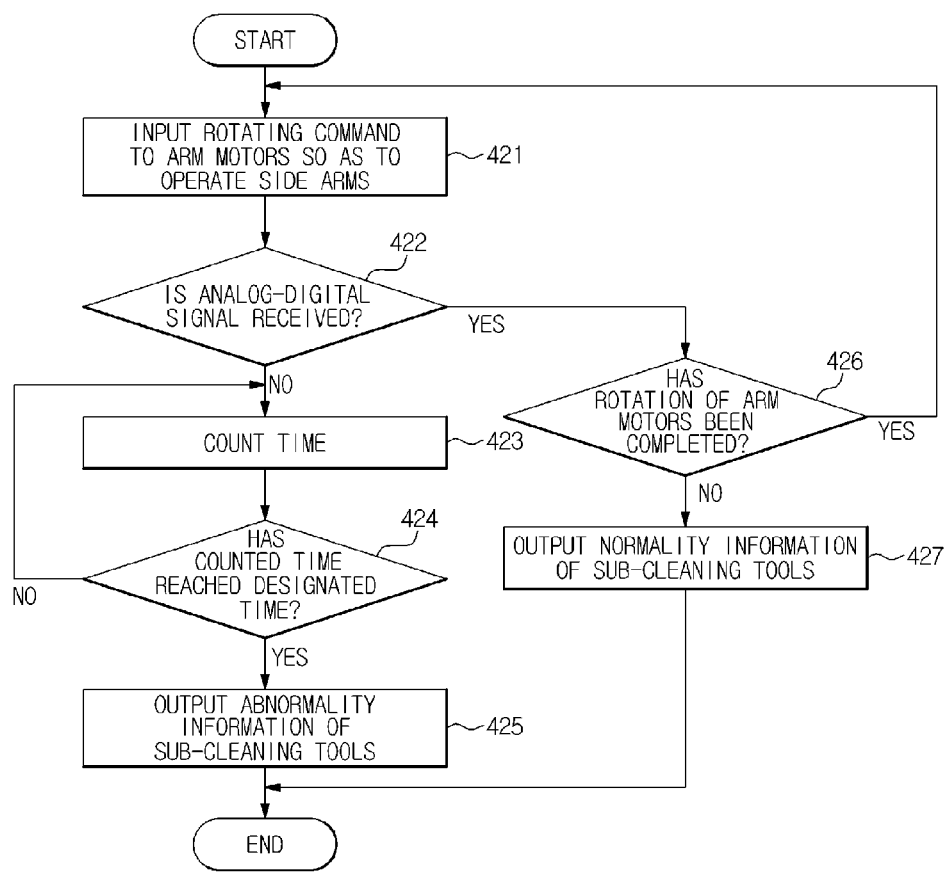
FIG. 9 is a flowchart illustrating a control method of a cleaning robot in a test mode in accordance with one or more embodiments.

FIG. 9 is a flowchart illustrating control of performance of a test mode to judge whether or not a cleaning robot in accordance with one or more embodiments is abnormal.

The cleaning robot may perform at least one of protrusion and insertion of the side arms 182 during performance of the test mode. At this time, the cleaning robot may protrude or insert the side arms 182 from or into the main body 110 under the condition that driving of the wheel motors 163 and 163 is stopped, or protrude or insert the side arms 182 from or into the main body 110 under the condition that driving of the wheel motors 163 and 163 is controlled so that the main body 110 travels by a designated distance.

First, upon judging that a time to perform the test mode has arrived, the cleaning robot may input a command to rotate the arm motors 184 in a first direction, i.e., a regular direction, to the arm motors 184 so as to protrude the side arms 182 from the main body 110 (Operation 421).

The test mode of the sub-cleaning tools 180 may be automatically performed prior to entry to the cleaning mode or may be performed based on a user command input through the user interface 120. The time to perform the test mode may be a time prior to entry to the cleaning mode or a time when the test mode is input through the user interface 120.

Thereafter, the cleaning robot may judge whether or not the controller 191 receives a signal corresponding to driving of the arm motors 184 (Operation 422). The signal corresponding to driving of the arm motors 184 may be a digital signal converted from a voltage signal of the arm motors 184.

Upon judging that the controller 191 does not receive the digital signal converted from an analog signal, i.e., the voltage signal of the arm motors 184, the cleaning robot may count a time for which the controller 191 does not receive the digital signal (Operation 423), and may judge whether or not the counted time has reached a designated time (Operation 424).

Upon judging that the counted time has reached the designated time, the cleaning robot may judge that the sub-cleaning tools 180 have been abnormal, and may output abnormality information of the sub-cleaning tools 180 through the display unit 122 so that a user may recognize abnormality of the sub-cleaning tools 180 (Operation 425).

Judgment as to whether the counted time has reached the designated time may serve to judges a state in which the digital signal is not temporarily received due to external noise.

On the other hand, upon judging that the controller 191 receives the digital signal, the cleaning robot may judge whether or not the controller 191 continuously receives the digital signal up to a time when rotation of the arm motors 184 has been completed.

That is, upon judging that the controller 191 receives the digital signal, the cleaning robot may judge whether or not rotation of the arm motors 184 has been completed (Operation 426), and upon judging that rotation of the arm motors 184 has been completed, the cleaning robot may judge that the sub-cleaning tools 180 are normal and may output normality information of the sub-cleaning tools 180 to the display unit 122 (Operation 427).

Although a process of judging abnormality of the side arms 182 provided on the sub-cleaning tools 180 while protruding the side arms 182 in the inserted state from the main body 110 has been described, abnormality of the side arms 182 provided on the sub-cleaning tool 180 may be judged while inserting the side arms 182 in the protruded state into the main body 110.

Further, the cleaning robot may first judge abnormality of the side arms 182 while protruding the side arms 182 in the inserted state from the main body 110, and may secondarily judge abnormality of the side arms 182 while inserting the side arms 182 in the protruded state into the main body 110.

Whether or not the side arms 182 of the sub-cleaning tools 180 are abnormal may be judged through the process of controlling at least one of protrusion and insertion of the side arms 182 of the sub-cleaning tools 180, and results of judgment may be output to the display unit 122 of the user interface 120, thereby possibly allowing a user to recognize abnormality of the sub-cleaning tools 180.

Figure 10:
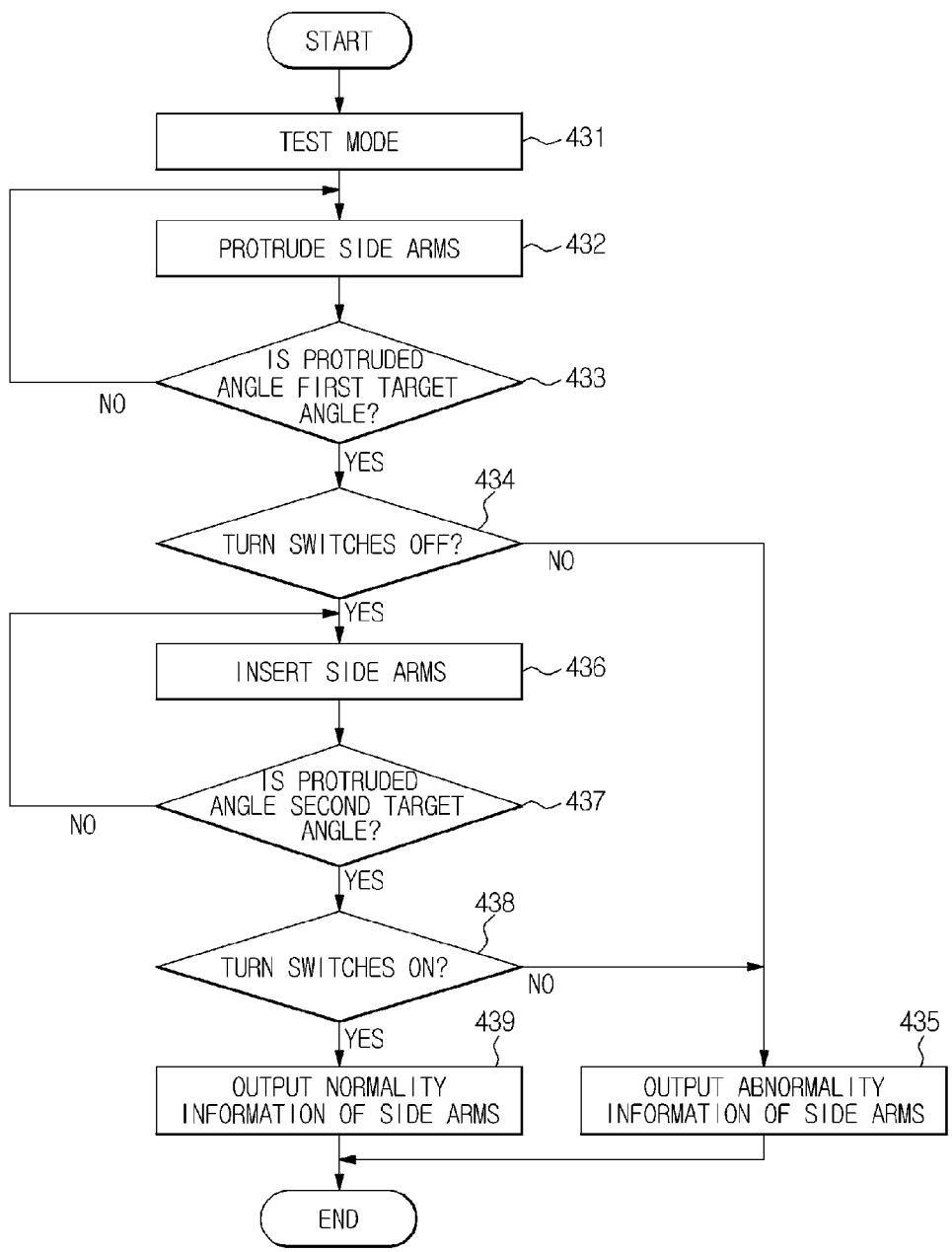
FIG. 10 is a flowchart illustrating a control method of a cleaning robot in a test mode in accordance with one or more embodiments.

FIG. 10 is a flowchart illustrating control of performance of a test mode of a cleaning robot in which a switch (with reference to FIGS. 6A and 6B) is provided on a sub-cleaning tool in accordance with one or more embodiments.

First, when a cleaning command is input, the cleaning robot may perform the test mode to judge abnormality of the sub-cleaning tools 180 prior to entry to the cleaning mode (Operation 431). Here, the test mode of the sub-cleaning tools 180 may be performed based on a command input to the user interface 120 by a user.

When the test mode is performed, the cleaning robot may input a command to rotate the arm motors 184 in a first direction, i.e., a regular direction, to the arm motors 184 so as to protrude the side arms 182 from the main body 110 (Operation 432).

Thereafter, the cleaning robot may judge whether or not the protrusion angle of the side arms 182 is a first target angle (Operation 433). Upon judging that the protrusion angle of the side arms 182 is the first target angle, the cleaning robot may judge whether or not the switches 189 are turned off (Operation 434). Then, upon judging that the switches 189 are turned off, the cleaning robot may judge that the side arms 182 are abnormal and may output abnormality information of the side arms 182 (Operation 435), and upon judging that the switches 189 are turned on, the cleaning robot may judge that the side arms 182 are normal (Operation 439).

The test mode may be completed by judging abnormality of the side arms 182 through the protrusion process of the side arms 182 provided on the sub-cleaning tools 180 in such a manner and, upon first judging that the side arms 182 are normal through the protrusion process of the side arms 182, whether or not the side arms 182 are normal may be secondarily judged through the insertion process of the side arms 182.

That is, when the switches 189 are turned off under the condition that protrusion of the side arms 182 has been completed, the cleaning robot may input a command to insert the side arms 182 into the main body 110 (Operation 436). Here, the cleaning robot may input a command to rotate the arm motors 184 in a second direction, i.e., the reverse regular direction, to the arm motors 184.

Thereafter, the cleaning robot may judge whether or not the insertion angle of the side arms 182 is a second target angle (Operation 437). Upon judging that the insertion angle of the side arms 182 is the second target angle, the cleaning robot may judge whether or not the switches 189 are turned on (Operation 438). Then, upon judging that the switches 189 are turned on, the cleaning robot may judge that the side arms 182 are normal and may output normality information of the side arms 182 through the display unit 122 (Operation 439), and upon judging that the switches 189 are turned off, the cleaning robot may judge that the side arms 182 are abnormal and may output abnormality information of the side arms 182 through the display unit 122 (Operation 435).

Whether or not the side arms 182 of the sub-cleaning tools 180 are abnormal may be judged through the process of confirming the output signals of the switches 189 according to control of protrusion and insertion of the side arms 182 of the sub-cleaning tools 180, and results of judgment may be output to the display unit 122 of the user interface 120, thereby possibly allowing a user to recognize abnormality of the sub-cleaning tools 180.

Figure 11B:
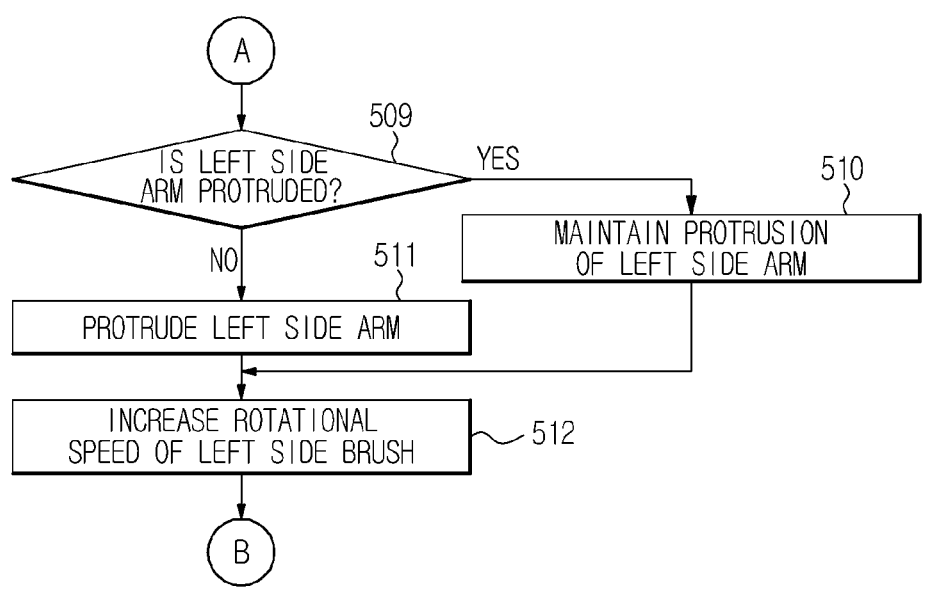

FIGS. 11A and 11B are a flowchart illustrating a control method of sub-cleaning tools if an obstacle is detected during traveling of the cleaning robot for cleaning of the cleaning robot.

The cleaning robot may judge whether or not an obstacle is present while traveling about a region to be cleaned by driving the wheel motors 163 and 164 to clean the region to be cleaned (Operation 501).

Upon judging that no obstacle is present based on an obstacle detection signal transmitted from the obstacle detector 132, the cleaning robot may rotate the left and right side arms 182 in the second direction so as to insert the left and right side arms 182 into the main body 110 (Operation 502). If the left and right side arms 182 are in the inserted state, the inserted state of the left and right side arms 184 may be maintained.

If rotation of the main body 110 is required during cleaning in a general region, the cleaning robot may rotate the main body 110 while inserting the side arm 182 located in the rotation direction considering that an undetected obstacle may be present at the rear of the main body 110.

Upon judging that an obstacle is present, the cleaning robot may judge the position of the obstacle by confirming a sensor outputting the obstacle detection signal from among the plural sensors of the obstacle detector 132.

The cleaning robot may judge whether or not the judged position of the obstacle is located at the right of the main body 110 (Operation 503), and, upon judging that the judged position of the obstacle is located at the right of the main body 110, may judge whether or not the side arm 182 located at the right of the main body 110 is in the protruded state (Operation 504).

Upon judging that the side arm 182 located at the right of the main body 110 is in the protruded state, the cleaning robot may maintain the protruded state of the left side arm 182 (Operation 505). On the other hand, upon judging that the right side arm 182 is in the inserted state, the cleaning robot may rotate the right arm motor 184 in a first direction so as to protrude the right side arm 182 from the main body 110 (Operation 506). At this time, the right arm motor 184 may be rotated to a predetermined first target angle.

The cleaning robot may increase the rotational speed of the right side brush 183 by increasing the rotational speed of the right second brush motor 185 simultaneously with protrusion of the right side arm 182 (Operation 507). Further, the cleaning robot may increase the rotational speed of the main brush 172 by increasing the rotational speed of the first brush motor 173 (Operation 508).

In more detail, the cleaning robot may increase the rotational speed of the main brush 172 from the initial rotational speed thereof, i.e., a first rotational speed, to a second rotational speed increased from the first rotational speed by a designated value, and may increase the rotational speed of the right side brush 183 from the initial rotational speed thereof, i.e., a third rotational speed, to a fourth rotational speed increased from the third rotational speed by a designated value.

For example, the first rotational speed of the first brush motor 173 may be about 750 RPM, the second rotational speed of the first brush motor 173 may be about 1,200 RPM, an operation factor corresponding to the third rotational speed of the second brush motor 185 may be about 60%, and an operation factor corresponding to the fourth rotational speed of the second brush motor 185 may be 90%.

Upon judging that the judged position of the obstacle is located at the left of the main body 110 during judgment of the position of the obstacle, the cleaning robot may judge whether or not the side arm 182 located at the left of the main body 110 is in the protruded state (Operation 509).

Upon judging that the side arm 182 located at the left of the main body 110 is in the protruded state under the condition that the obstacle is located at the left of the main body 110, the cleaning robot may maintain the protruded state of the left side arm 182 (Operation 510). On the other hand, upon judging that the left side arm 182 is in the inserted state under the condition that the obstacle is located at the left of the main body 110, the cleaning robot may rotate the left arm motor 184 in the first direction so as to protrude the left side arm 182 from the main body 110 (Operation 511). At this time, the left arm motor 184 may be rotated to the predetermined first target angle.

Then, the cleaning robot may increase the rotational speed of the left side brush 183 by increasing the rotational speed of the left second brush motor 185 simultaneously with protrusion of the left side arm 182 (Operation 512). Further, the cleaning robot may increase the rotational speed of the main brush 172 by increasing the rotational speed of the first brush motor 173 (Operation 508).

In more detail, the cleaning robot may increase the rotational speed of the main brush 172 from the initial rotational speed thereof, i.e., the first rotational speed, to the second rotational speed increased from the first rotational speed by the designated value, and may increase the rotational speed of the left side brush 183 from the initial rotational speed thereof, i.e., the third rotational speed, to the fourth rotational speed increased from the third rotational speed by the designated value.

Thereafter, the cleaning robot may judge whether or not cleaning around the obstacle has been completed (Operation 513), and, upon judging that cleaning around the obstacle has been completed, may insert the left and right side arms 182 into the main body.

After judgment of completion of cleaning around the detected obstacle, the cleaning robot may maintain the protruded state of the protruded side arm 182 for a predetermined time. Thereby, when another obstacle adjacent to the detected obstacle is present and cleaning while tracing the latter obstacle is performed, re-protrusion of the side arm 182 may be prevented. At this time, traveling may be controlled such that the protruded side arm 182 contacts a boundary of the latter obstacle.

Further, if cleaning around the obstacle has been completed and the left and right arms 182 need to be inserted into the main body 110, when one side arm is in the inserted state, only the remaining side arm 182 in the protruded state may be inserted into the main body 110. At this time, the arm motor 184 of the side arm 182 in the protruded state may be rotated in a second direction to a second target angle.

Further, the cleaning robot may return the rotational speeds of the right side brush 183 and the main brush 172 to the initial rotational speeds thereof (Operation 514). That is, the cleaning robot may decrease the rotational speed of the main brush 172 to the first rotational speed and may decrease the rotational speed of the right side brush 183 to the third rotational speed.

If the cleaning robot cleans a wall while tracing the wall, foreign substances attached to the side brush 183 adjacent to the wall may be removed from the side brush 183 by increasing the rotational speed of the side brush 183, and the foreign substances removed from the side brush 183 may be moved to the dust collector by increasing the rotational speed of the main brush 172.

Further, if a suction unit is provided in the cleaning robot, the collection performance of the foreign substances removed from the side brush 183 may be improved by increasing suction force of the suction unit.

Further, the cleaning robot may protrude the left and right side arms 182 and increase the rotational speed of only the right side brush 183, upon judging that a wall is located at the right of the main body 110, and may protrude the left and right side arms 182 and increase the rotational speed of only the left side brush 183, upon judging that a wall is located at the left of the main body 110. At this time, the cleaning robot may increase the rotational speed of the main brush 172.

As described above, when the cleaning robot cleans a wall, the cleaning robot may increase the rotational speeds of the main cleaning tool 170 and the sub-cleaning tools 180, thus possibly improving the cleaning performance of an angled corner.

This will be briefly described with reference to FIGS. 12(*a*) to 12(*c*).

Figure 12A:
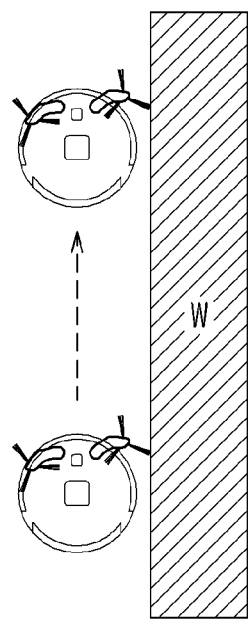
FIGS. 12(a) to 12(c) are exemplary views illustrating control of operation of sub-cleaning tools according to one or more embodiments, such as the sub-cleaning tools of FIGS. 11A and 11B.
Figure 12B:
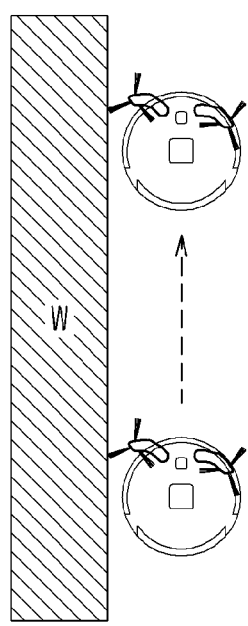
Figure 12C:
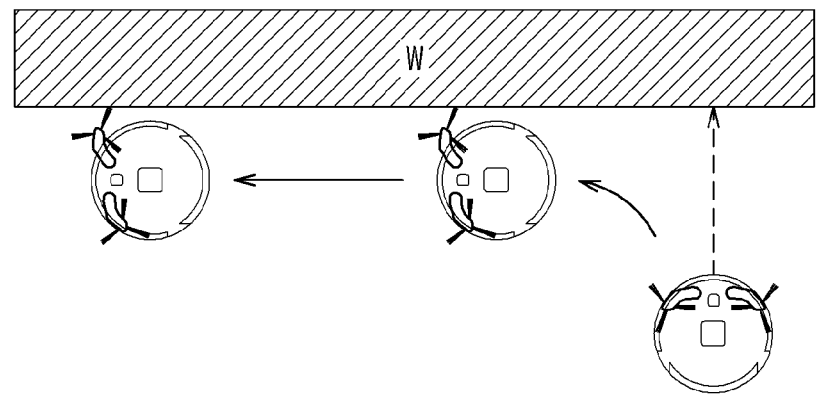

As exemplarily shown in FIG. 12(*a*), upon judging that an obstacle is located at the right of the main body, the cleaning robot may rotate the right side brush at the fourth rotational speed under the condition that the right side arm may be protruded from the main body, thus possibly cleaning the boundary of the obstacle located at the right of the main body. At this time, the cleaning robot may rotate the left side brush at the third rotational speed under the condition that the left side arm may be inserted into the main body.

As exemplarily shown in FIG. 12(*b*), upon judging that an obstacle is located at the left of the main body, the cleaning robot may rotate the left side brush at the fourth rotational speed under the condition that the left side arm may be protruded from the main body, thus possibly cleaning the boundary of the obstacle located at the left of the main body. At this time, the cleaning robot may rotate the right side brush at the third rotational speed under the condition that the right side arm may be inserted into the main body.

As exemplarily shown in FIG. 12(*c*), upon judging that an obstacle is located in front of the main body, the cleaning robot may determine an obstacle tracing direction to trace the obstacle, may determine the rotation direction of the main body to trace the obstacle in the determined tracing direction, may insert the side arm, located in the rotation direction of the main body, into the main body, and may protrude the side arm, located in the obstacle tracing direction, from the main body while rotating the main body in the determined rotation direction of the main body.

That is, if it is determined that the cleaning robot traces an obstacle under the condition that the obstacle is located at the right of the main body, the cleaning robot may determine that the main body is rotated in the leftward direction to trace the obstacle located at the right of the main body. Thereby, the cleaning robot may insert the left side arm into the main body, may protrude the right side arm from the main body, may rotate the left side brush at the third rotational speed, and may rotate the right side brush at the fourth rotational speed, thus possibly cleaning the boundary of the obstacle.

Figure 13A:
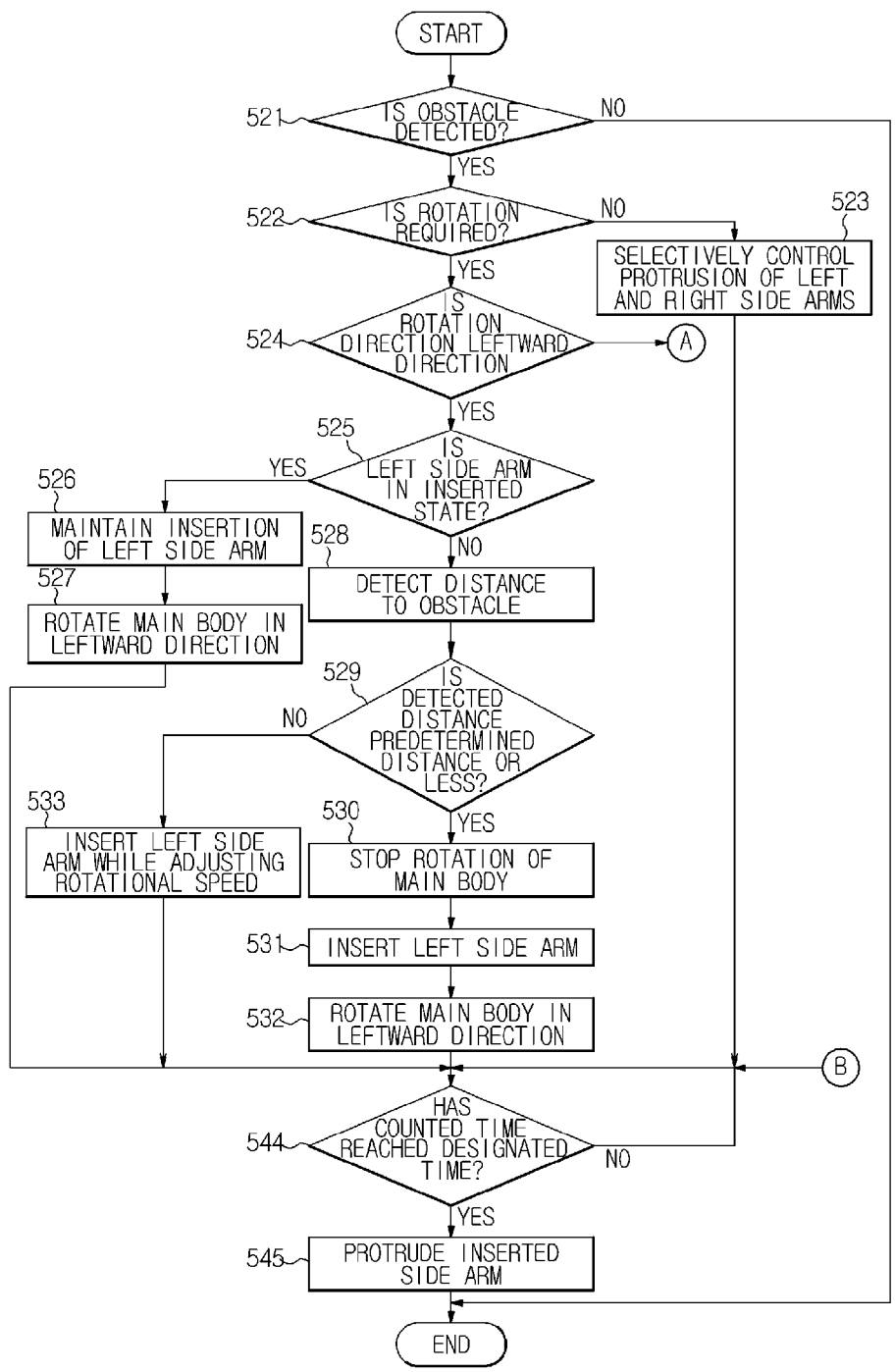
FIGS. 13A and 13B are a flowchart illustrating a control method of the sub-cleaning tools when a main body is rotated during traveling of the cleaning robot for obstacle tracing in the cleaning robot in accordance with one or more embodiments.
Figure 13B:
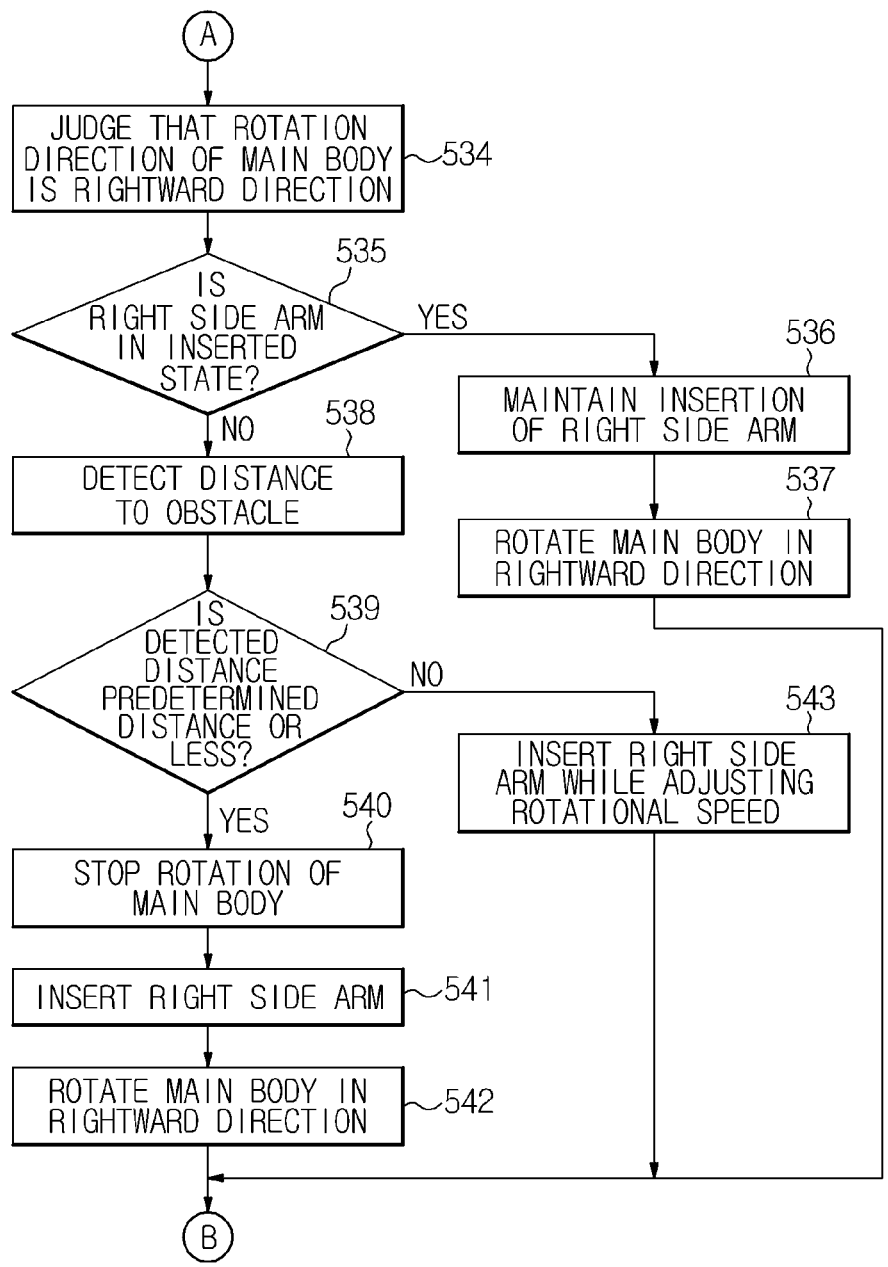

FIGS. 13A and 13B are a flowchart illustrating a control method of the sub-cleaning tools when the main body is rotated during traveling of the cleaning robot for obstacle tracing. Hereinafter, such a control method will be described with reference to FIG. 13A, FIG. 13B and FIGS. 14(*a*) to 14(*b*).

The cleaning robot may travel while tracing an obstacle and may continuously detect the obstacle (Operation 521), and may judge whether or not rotation of the main body is required based on an obstacle detection signal of the obstacle detector 132 (Operation 522).

Here, the case that rotation of the main body is required means the case that change of the traveling direction of the cleaning robot is required during traveling of the cleaning robot for obstacle tracing. For example, this case may be performed when a corner part of the obstacle or a curved part of a designated curvature or more of the obstacle may be detected.

Upon judging that rotation of the main body 110 is not required (Operation 522), the cleaning robot may selectively rotate the left and right arm motors 184, i.e., may selectively rotate the left and right arm motors 184 to the first target angle so as to selectively protrude the left and right side arms 182 (Operation 523). At this time, the cleaning robot may perform cleaning while rotating the first brush motor 172 at the first rotational speed and rotating the second brush motors 185 at the third rotational speed.

Here, selective protrusion of the left and right side arms 182 may be performed according to the control method of FIGS. 11A and 11B.

On the other hand, upon judging that rotation of the main body 110 is required, the cleaning robot may judge whether or not the rotation direction of the main body 110 is the leftward direction (Operation 524). Then, upon judging that the rotation direction of the main body 110 is the leftward direction, the cleaning robot may judge whether or not the left side arm 182 is in the inserted state (Operation 525).

Upon judging that the left side arm 182 is in the inserted state under the condition that it is judged that the rotation direction of the main body 110 is the leftward direction, the cleaning robot may maintain the inserted state of the left side arm 182 (Operation 526), and then may rotate the main body 110 in the leftward direction (Operation 527).

On the other hand, upon judging that the left side arm 182 is in the protruded state under the condition that it is judged that the rotation direction of the main body 110 is the leftward direction, the cleaning robot may detect a distance to the obstacle located at the left of the main body 110 based on the obstacle detection signal detected by the obstacle detector 132 (Operation 528).

When the obstacle is located at the left of the main body 110, the distance to the obstacle may be detected using an obstacle detection signal sensed by the sensor of the obstacle detector 132 located at the left portion of the main body 110.

Thereafter, the cleaning robot may compare the detected distance to the obstacle with a predetermined distance (Operation 529), and may stop driving of the wheel motors so as to stop rotation of the main body, if the distance to the obstacle is the predetermined distance or less (Operation 530). Then, the cleaning robot may insert the left side arm 182 into the main body 110 by rotating the left arm motor up to the second target angle (Operation 531), and may rotate the main body 110 in the leftward direction when insertion of the left side arm 182 has been completed (Operation 532).

On the other hand, if the distance to the obstacle exceeds the predetermined distance, the cleaning robot may insert the left side arm into the main body by rotating the left arm motor up to the second target angle while adjusting the leftward rotational speed of the main body 110 by adjusting the speeds of the left and right wheel motors (Operation 533).

Upon judging that the rotation direction of the main body 110 is not the leftward direction, the cleaning robot may judge that the rotation direction of the main body 110 is the rightward direction (Operation 534) and may judge whether or not the right side arm is in the inserted state (Operation 535).

Upon judging that the right side arm is in the inserted state under the condition that it is judged that the rotation direction of the main body 110 is the rightward direction, the cleaning robot may maintain the inserted state of the right side arm (Operation 536) and then may rotate the main body in the rightward direction (Operation 537).

On the other hand, upon judging that the right side arm is in the protruded state under the condition that it is judged that the rotation direction of the main body 110 is the rightward direction, the cleaning robot may detect a distance to the obstacle located at the right of the main body 110 based on the obstacle detection signal detected by the obstacle detector 132 (Operation 538).

Thereafter, the cleaning robot may compare the detected distance to the obstacle with a predetermined distance (Operation 539), and may stop driving of the wheel motors so as to stop rotation of the main body, if the distance to the obstacle is the predetermined distance or less (Operation 540). Then, the cleaning robot may insert the right side arm 182 into the main body 110 by rotating the right arm motor up to the second target angle (Operation 541), and may rotate the main body 110 in the right direction when insertion of the right side arm 182 has been completed (Operation 542).

On the other hand, if the distance to the obstacle exceeds the predetermined distance, the cleaning robot may insert the right side arm into the main body by rotating the right arm motor up to the second target angle while adjusting the rightward rotational speed of the main body 110 by adjusting the speeds of the left and right wheel motors (Operation 543).

When the side arm is inserted into the main body while controlling the rotational speed of the main body 110 based on the distance to the obstacle, as described above, interference between the side arm and the obstacle may be prevented.

Thereafter, when rotation of the main body has been completed, the cleaning robot may count time from a point of time when rotation of the main body has been completed, and may judge whether or not the counted time has reached a designated time (Operation 544). Upon judging that the counted time has reached the designated time, the cleaning robot may rotate the arm motor so that the inserted side arm is protruded from the main body (Operation 545).

Now, control of insertion of the left side arm or the right side arm will be described in more detail.

First, control of insertion of the left side arm will be described with reference to FIGS. 14(a) and 14(b).

The cleaning robot may travel along an obstacle under the condition that the side arm in a direction of detected obstacle may be protruded from the main body. When the main body is rotated, the side arm in the rotation direction of the main body may be inserted into the main body. Thereby, if the main body may be rotated along the obstacle, as exemplarily shown in FIGS. 14(a) and 14(c), collision of the main body with the obstacle, generated during rotation of the main body, may be prevented. Further, if the main body is rotated with respect to a corner where walls meet in a region to be cleaned, as exemplarily shown in FIGS. 14(b) and 14(d), the cleaning robot may travel for cleaning while maintaining the protruded state of the side arm to the walls and thus, corner coverage may be improved. Further, the side arm in the direction opposite to the walls corresponds to the rotation direction of the main body and may thus be inserted into the main body during rotation. This may lower a possibility of collision of the main body with a potential obstacle during rotation.

Figure 14A:
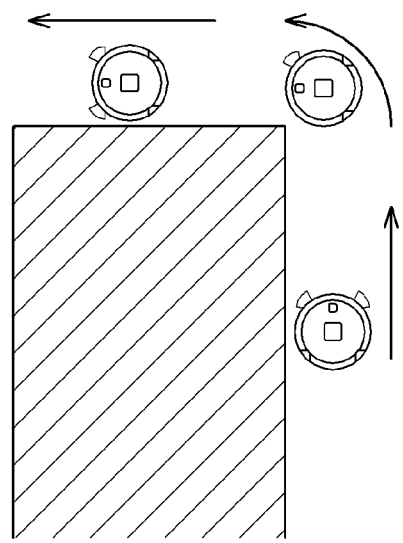
FIGS. 14(a) to 14(d) are exemplary views illustrating control of operation of sub-cleaning tools according to one or more embodiments, such as the sub-cleaning tools of FIGS. 13A and 13B.
Figure 14B:
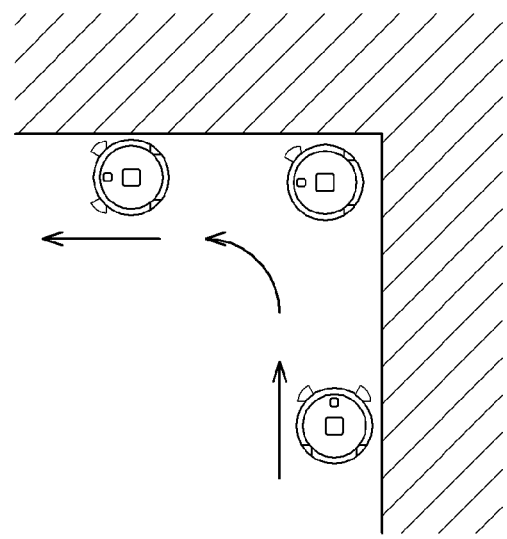
Figure 14C:
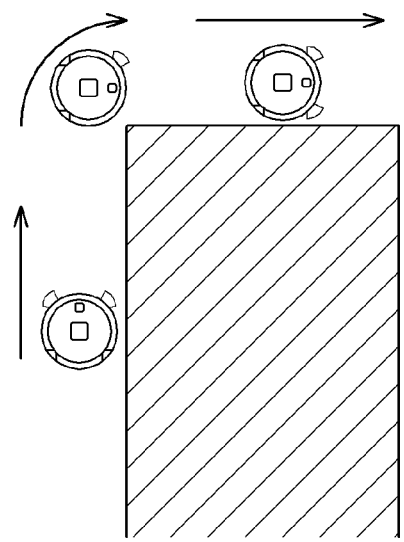
Figure 14D:
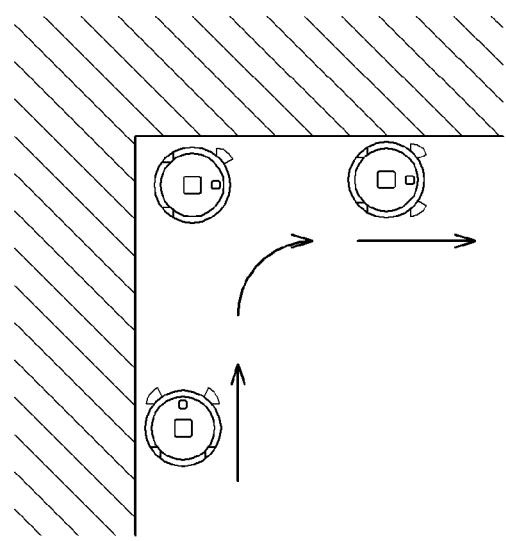

Further, traveling for tracing an obstacle, as exemplarily shown in FIGS. 14(a) and 14(c), or traveling for cleaning a corner, as exemplarily shown in FIGS. 14(b) and 14(d), may be determined according to whether or not an obstacle detection signal is generated from an obstacle sensor located on the front surface of the main body.

As exemplarily shown in FIG. 14(a), the cleaning robot may travel along an obstacle under the condition that both the left and right side arms are protruded, may judge that the obstacle has a left angled portion and thus leftward rotation of the main body may be required, upon judging that no obstacle is present in front of and at the right of the main body, and thus may rotate the main body in the leftward direction under the condition that the left side arm is inserted into the main body. Then, when leftward rotation of the main body has been completed, the cleaning robot may again protrude the left side arm from the main body. Thereby, when the main body is rotated along the obstacle in the leftward direction, interference of the left side arm with the corner portion of the obstacle may be prevented.

As exemplarily shown in FIG. 14(b), the cleaning robot may travel along an obstacle under the condition that both the left and right side arms are protruded, may judge that leftward rotation of the main body is required, upon judging that the obstacle is present in front of the main body and no obstacle is present at the left of the main body, and thus may rotate the main body in the leftward direction under the condition that the left side arm is inserted into the main body. Then, when leftward rotation of the main body has been completed, the cleaning robot may again protrude the left side arm from the main body. Thereby, when the main body is rotated in the leftward direction, the angled portion of the obstacle may be cleaned.

As exemplarily shown in FIG. 14(c), the cleaning robot may travel along an obstacle under the condition that both the left and right side arms are protruded, may judge that the obstacle has a right angled portion and thus rightward rotation of the main body is required, upon judging that no obstacle is present in front of and at the right of the main body, and thus may rotate the main body in the rightward direction under the condition that the right side arm is inserted into the main body. Then, when rightward rotation of the main body has been completed, the cleaning robot may again protrude the right side arm from the main body. Thereby, when the main body is rotated along the obstacle in the rightward direction, interference of the right side arm with the corner portion of the obstacle may be prevented.

As exemplarily shown in FIG. 14(d), the cleaning robot may travel along an obstacle under the condition that both the left and right side arms are protruded, may judge that rightward rotation of the main body is required, upon judging that the obstacle is present in front of the main body and no obstacle is present at the right of the main body, and thus may rotate the main body in the rightward direction under the condition that the right side arm is inserted into the main body. Then, when rightward rotation of the main body has been completed, the cleaning robot may again protrude the right side arm from the main body. Thereby, when the main body is rotated in the rightward direction, the angled portion of the obstacle may be cleaned.

Figure 15:
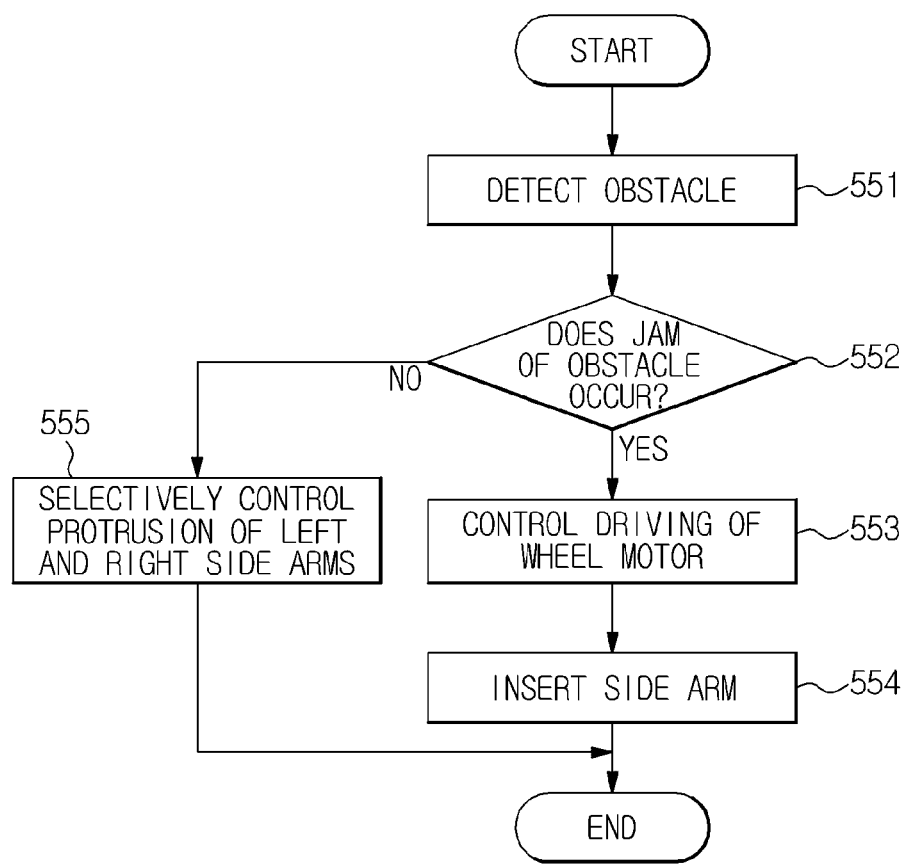
FIG. 15 is a flowchart illustrating control of operation of the sub-cleaning tools of the cleaning robot in accordance with one or more embodiments when a jam of the sub-cleaning tool occurs.

FIG. 15 is a flowchart illustrating a control method of the cleaning robot when jam of an obstacle into the sub-cleaning tool occurs.

The cleaning robot may detect an obstacle using the obstacle detector 132 while traveling based on a predetermined traveling pattern (Operation 551), and may confirm the position of the detected obstacle.

The cleaning robot may confirm the RPM of the wheel motors under the condition that the obstacle has been detected.

The cleaning robot may compare the confirmed RPM of the wheel motors with a target RPM, and may judge a change of the pose and position of the cleaning robot corresponding to rotation of the wheel motors, if the RPM of the wheel motors reaches the target RPM.

Thereafter, the cleaning robot may compare the change of the pose and position of the cleaning robot corresponding to rotation of the wheel motors with change of the pose and position of the cleaning robot detected by the pose detector, may judge that jam of the obstacle into the sub-cleaning tool does not occur if the change of the pose and position of the cleaning robot corresponding to rotation of the wheel motors is equal to the change of the pose and position of the cleaning robot detected by the pose detector as results of comparison, and may judge that jam of the obstacle into the sub-cleaning tool occurs if the change of the pose and position of the cleaning robot corresponding to rotation of the wheel motors differs from the change of the pose and position of the cleaning robot detected by the pose detector as results of comparison (Operation 552).

That is, if jam of the obstacle into the sub-cleaning tool into the obstacle occurs, although the wheel motors are rotated to move the main body, the actual pose and position of the main body may not be changed.

Thereafter, upon judging that jam of the obstacle into the sub-cleaning tool occurs, the cleaning robot may control driving of the wheel motors so that the main body may be moved so as to possibly deviate the side arm of the sub-cleaning tool from the jam position (Operation 553), and then may insert the side arm into the main body by rotating the arm motor 184 of the side arm (Operation 554).

Upon judging that jam of the obstacle into the sub-cleaning tool does not occurs under the condition that the obstacle detected, the cleaning robot may selectively control protrusion of the left and right side arms and performs cleaning while tracing the obstacle (Operation 555)

Thereafter, the cleaning robot may prevent re-jam of another obstacle into the side arm by maintaining the inserted state of the side arm for a designated time from insertion of the side arm.

This will be described with reference to FIGS. 16(a) to 16(c).

Figure 16A:
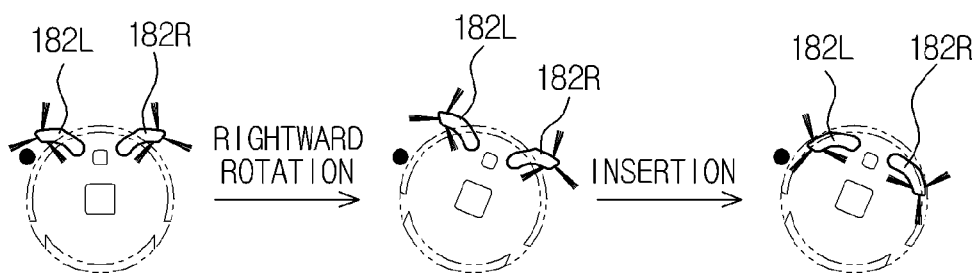
FIGS. 16(a) to 16(c) are exemplary views illustrating control of operation of the sub-cleaning tools of the cleaning robot in accordance with one or more embodiments when a jam of an obstacle into the sub-cleaning tools occurs.
Figure 16B:
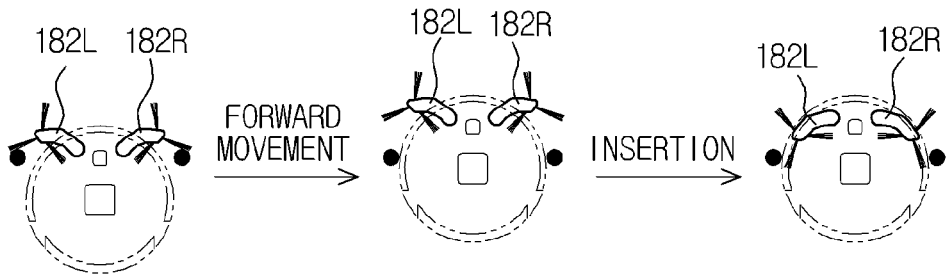
Figure 16C:
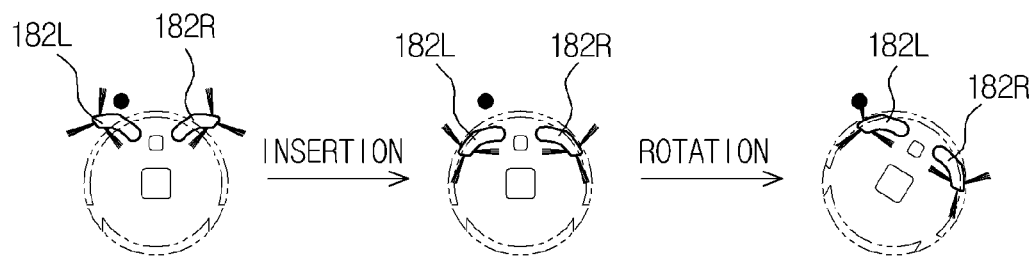

FIG. 16(a) is an exemplary view illustrating the case that an obstacle is jammed into the left side arm, and the obstacle is located in the insertion direction of the left side arm.

If the pose detector 134 does not output a signal corresponding to change of the pose and position of the main body 110 under the condition that the obstacle has been detected by the sensor L3 located on the left surface of the main body among the plural sensors of the obstacle detector 132, the cleaning robot may judge that the obstacle is jammed into the left side arm 182L.

That is, upon judging that the pose detector 134 does not output a signal corresponding to change of the pose and position of the main body 110 according to traveling although the wheel motors are driven to cause the main body 110 to travel, the cleaning robot may judge that the obstacle is jammed into the left side arm 182L.

In this case, when the obstacle is located in the insertion direction of the left side arm 182L, insertion of the left side arm 182L into the main body 110 may not be carried out.

Therefore, the cleaning robot may rotate the main body 110 in the rightward direction so as to possibly deviate the left side arm 182L from the obstacle located in the insertion direction by controlling driving of the wheel motors, and may insert the left side arm 182L into the main body 110 by rotating the left arm motor.

Further, the cleaning robot may insert the right side arm 182R into the main body 110 by rotating the right arm motor.

Since an obstacle is not jammed into the right side arm 182R, the right side arm 182R may be inserted into the main body 110 before rightward rotation of the main body 110.

If an obstacle is jammed into the right side arm 182R, the cleaning robot may rotate the main body 110 in the leftward direction and then may insert the right side arm 182R into the main body 110.

FIG. 16(*b*) is an exemplary view illustrating the case that obstacles are jammed into the left and right side arms.

If the pose detector 134 does not output a signal corresponding to change of the pose and position of the main body 110 under the condition that the obstacles are detected by the sensor L3 located on the left surface of the main body and the sensor R3 located on the right surface of the main body among the plural sensors of the obstacle detector 132, the cleaning robot may judge that the obstacles are jammed into the left and right side arms 182L and 182R.

That is, if it is judged that the pose detector 134 does not output a signal corresponding to change of the pose and position of the main body 110 according to traveling although the wheel motors are driven to cause the main body 110 to travel, the cleaning robot may judge that the obstacles are jammed into the left and right side arms 182L and 182R.

In this case, when the obstacles are located in the insertion directions of the left and right side arms 182L and 182R, insertion of the left and right side arms 182L and 182R into the main body 110 may not be carried out.

Therefore, the cleaning robot may move the main body 110 forward so as to possibly deviate the left and right side arms 182L and 182R from the obstacles located in the insertion directions by controlling driving of the wheel motors, and may insert the left and right side arms 182L and 182R into the main body 110 by rotating the left and right arm motors.

FIG. 16(*c*) is an exemplary view illustrating the case that an obstacle is jammed into the left side arm, and the obstacle is located in the protrusion direction of the left side arm.

In this case, the side arms 182L and 182R may be mechanically inserted into the main body by the elastic members 186*c* provided on the sub-cleaning tools 180.

If the pose detector 134 does not output a signal corresponding to change of the pose and position of the main body 110 under the condition that the obstacle has been detected by the sensor L2 located on the left surface of the main body among the plural sensors of the obstacle detector 132, the cleaning robot may judge that the obstacle is jammed into the left side arm 182L.

That is, if it is judged that the pose detector 134 does not output a signal corresponding to change of the pose and position of the main body 110 according to traveling although the wheel motors are driven to cause the main body 110 to travel, the cleaning robot may judge that the obstacle is jammed into the left side arm 182L.

In this case, when the obstacle is located in the protrusion direction of the left side arm 182L, insertion of the left side arm 182L into the main body 110 may be carried out.

Therefore, the cleaning robot may insert the left side arm 182L into the main body 110 by rotating the left arm motor, and may change the traveling direction by rotating the main body 110 in the rightward direction by controlling driving of the wheel motors.

Further, the cleaning robot may insert the right side arm 182R into the main body 110 by rotating the right arm motor.

Since an obstacle is not jammed into the right side arm 182R, the right side arm 182R may be inserted into the main body 110 before rightward rotation of the main body 110.

In such a manner, jam of obstacles is may be using the obstacle detector and the pose detector and movement of the main body may be controlled so that the sub-cleaning tools are deviated from jam of the obstacles, thus possibly improving the cleaning performance of the cleaning robot.

When the side arm is maximally protruded from the main body, a space (for example, a distance of about 4 cm) may be formed between the main body and the protruded side arm. If an obstacle within such a space is sensed, the main body may become in a state in which the obstacle may be jammed into the side arm. Therefore, in this case, jam of the obstacle may be prevented by inserting the side arm during traveling of the main body. The side arm is not protruded from the main body for a designated time after insertion of the side arm (for example, about 2~3 seconds), even if the cleaning robot meets an obstacle, thus possibly preventing additional jam of the obstacle.

Figure 17:
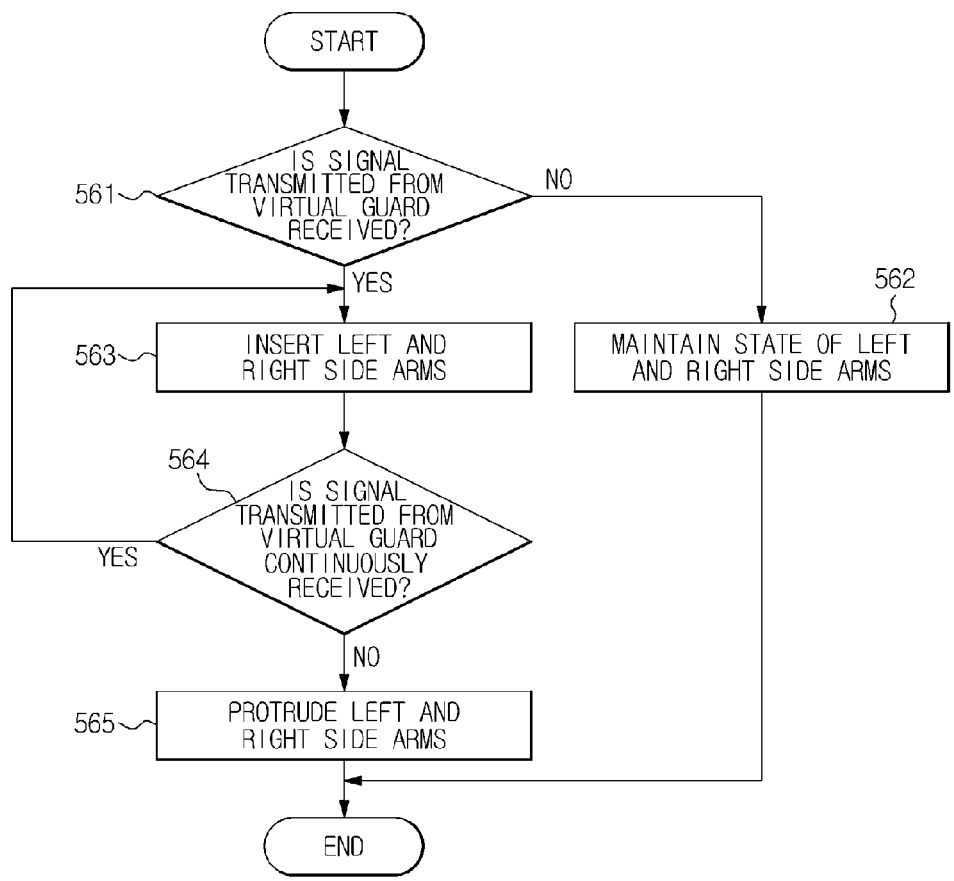
FIG. 17 is a flowchart illustrating control of operation of the sub-cleaning tools of the cleaning robot in accordance with one or more embodiments when the cleaning robot travels in an entry restriction region.

FIG. 17 is a flowchart illustrating a control method of the sub-cleaning tools in an entry restriction region. Such a control method will be described with reference to FIGS. 17 and 18.

The cleaning robot may judge whether or not a halo signal is received through the second communicator 142 during cleaning (Operation 561), and may maintain the state of the left and right side arms upon judging that the halo signal is not received (Operation 562).

Figure 18:
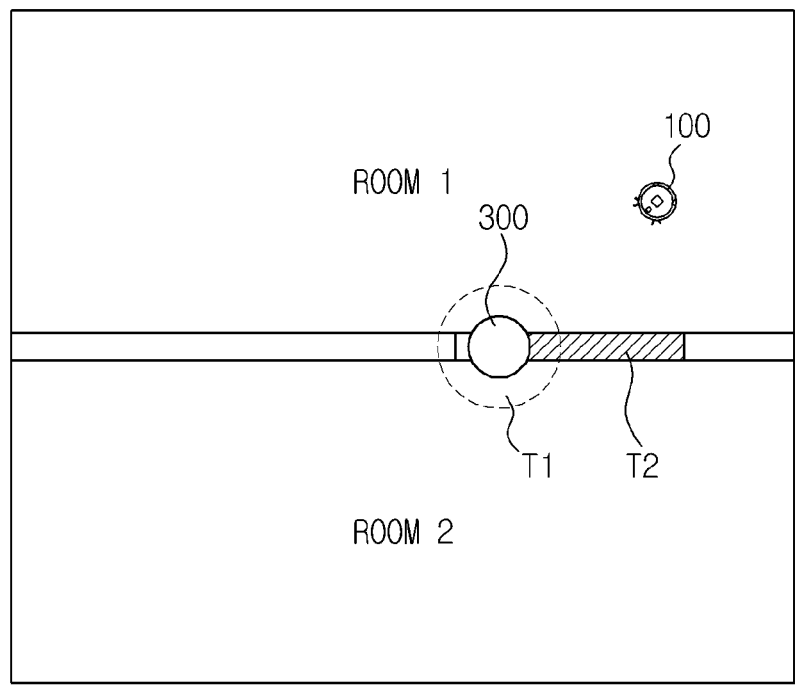
FIG. 18 is an exemplary view illustrating control of operation of sub-cleaning tools according to one or more embodiments, such as the operations of FIG. 17.

As exemplarily shown in FIG. 18, in order to restrict entry of the cleaning robot into a second region to be cleaned (Room 2) under the condition that the cleaning robot cleans a first region to be cleaned (Room 1), a virtual guard 300 may be located at a passage connecting the first region to be cleaned and the second region to be cleaned. Here, a halo region T1 may be formed around the virtual guard 300, i.e., within a designated distance (for example, about 30 cm) from the virtual guard 300, and an entry restriction signal T2 may be transmitted to the passage connecting the two regions.

If the halo signal is received through the second communicator 142 during cleaning, in order to prevent collision of the cleaning robot with the virtual guard 300 and jam of obstacles, the cleaning robot may insert the left and right side arms into the main body by rotating the arm motors up to the second target angle (Operation 563). Since a region around the virtual guard 300 should be cleaned, the main brush may be continuously rotated.

Thereafter, the cleaning robot may judge whether or not the halo signal is continuously received through the second communicator 142 (Operation 564), may maintain the inserted state of the left and right side arms upon judging that the halo signal is continuously received, and may protrude the left and right side arms from the main body by rotating the left and right arm motors up to the first target angle (Operation 565). That is, in the halo region, the side arms may be inserted and insertion of the side arms may be maintained.

By inserting the side arms into the main body if the signal from the virtual guard 300 is received, in such a manner, collision with the virtual guard 300 to prevent the cleaning robot from entering the entry restriction region may be prevented. Thereby, change of the position of the virtual guard 300 or change of the pose of the virtual guard 300 may be prevented. That is, change of the direction of a transmission unit transmitting an entry restriction signal representing the entry restriction region may be prevented.

Further, the cleaning robot may perform protrusion or insertion of the side arms in a region where the entry restriction signal is received. That is, the reason for this is that the cleaning robot may not collide with the virtual guard at a position where the entry restriction signal is received.

Figure 19:
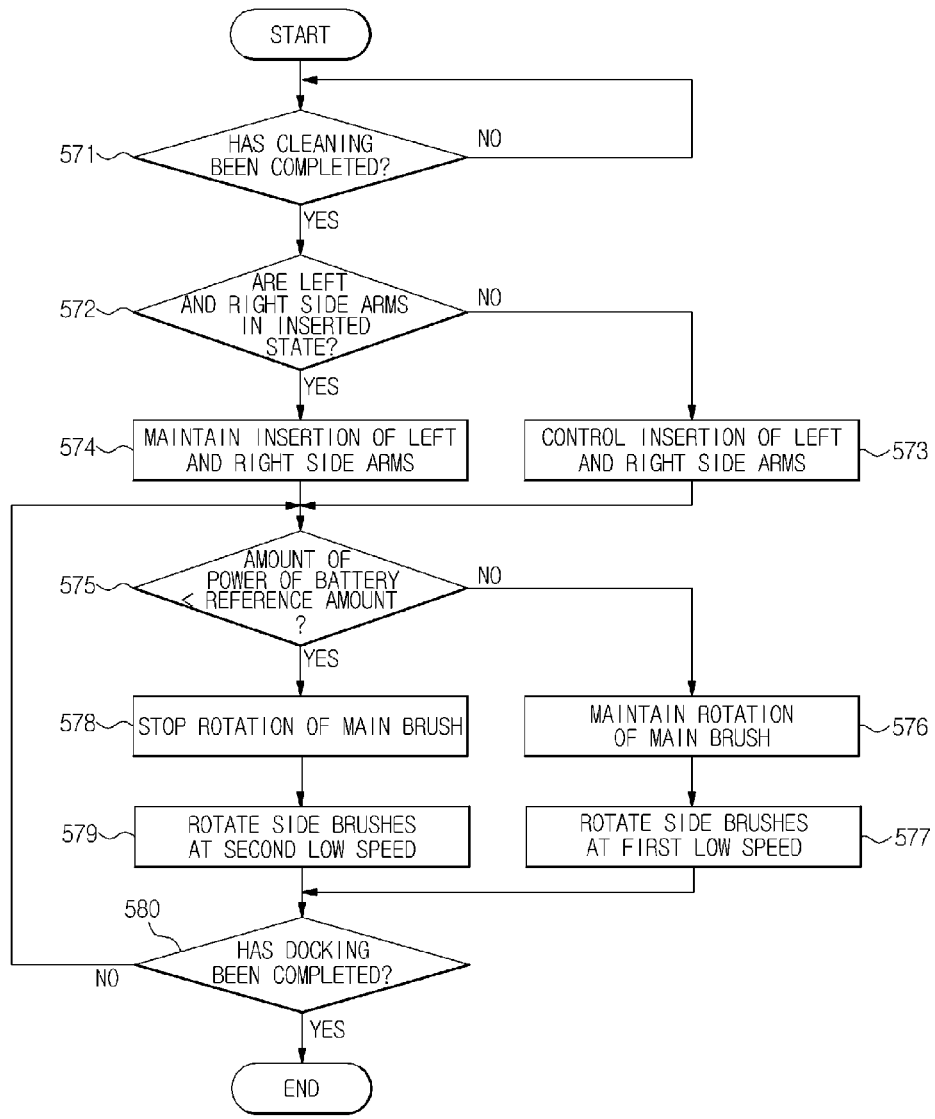
FIG. 19 is a flowchart illustrating control of operation of the sub-cleaning tools of the cleaning robot in accordance with one or more embodiments after cleaning has been completed.

FIG. 19 is a flowchart illustrating a control method of the sub-cleaning tools after cleaning has been completed.

The cleaning robot may judge whether or not cleaning has been completed (Operation 571).

Thereafter, the cleaning robot may judge whether or not the left and right side arms are in the inserted state (Operation 572), may rotate the arm motors so as to insert the left and right side arms into the main body upon judging that the left and right side arms are not in the inserted state (Operation 573), and may maintain the inserted state of the left and right side arms upon judging that the left and right side arms are in the inserted state (Operation 574).

The cleaning robot may detect the amount of power of the battery and may compare the detected amount of the power of the battery with a reference amount (Operation 575). If the detected amount of the power of the battery is not below the reference amount, the cleaning robot may maintain rotation of the main brush (Operation 576), and may rotate the side brushes at a first low speed (Operation 577).

On the other hand, if the detected amount of the power of the battery is below the reference amount, the cleaning robot may stop rotation of the main brush (Operation 578), and may rotate the side brushes at a second low speed (Operation 579).

Here, the second low speed of the side brushes may be lower than the first low speed of the side brushes. Further, even if the detected amount of the power of the battery is below the reference amount, the side brushes may be continuously rotated. This may serve to prevent folding or warping of the side brushes. Operation 572 and Operation 575 may be carried out in reverse order.

Thereafter, the cleaning robot may control driving of the wheel motors and may perform docking with the charging station while performing communication with the charging station, and may judge whether or not docking with the charging station has been completed (Operation 580). Upon judging that docking with the charging station has been completed, the cleaning robot may stop rotation of the main brush and rotation of the side brushes.

By inserting the left and right side arms 182 into the main body by rotating the left and right arm motors 184 up to the second target angle during docking with the charging station, in such a manner, friction between the sub-cleaning tools and the floor may be reduced and thus a time taken to perform docking with the charging station may be reduced, energy consumption used in docking with the charging station may be reduced, and collision with an obstacle or jam of the obstacle into the side arms 182 during docking with the charging station may be prevented.

Figure 20:
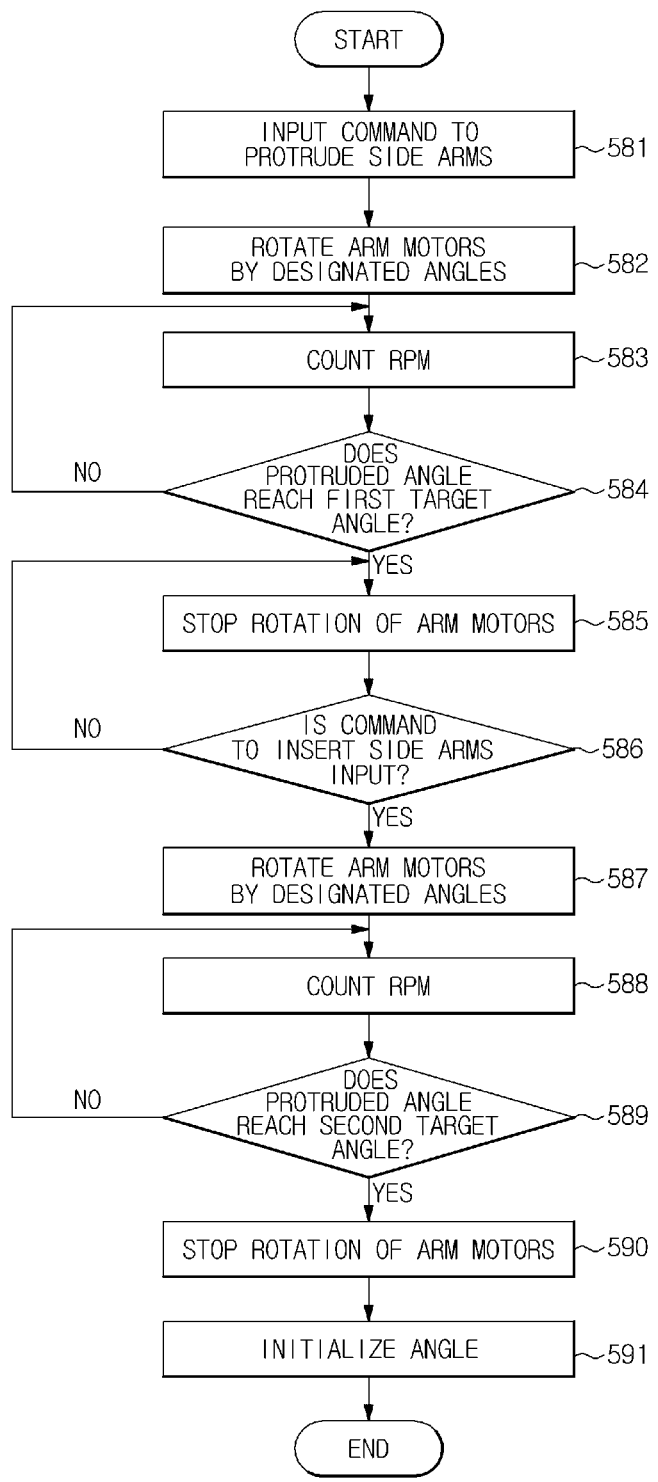
FIG. 20 is a flowchart illustrating angle control when insertion and protrusion of the sub-cleaning tools provided on the cleaning robot in accordance with one or more embodiments is controlled.

FIG. 20 is a flowchart illustrating a control method of insertion and protrusion of the sub-cleaning tools.

When a command to protrude the side arms from the main body is input (Operation 581), the cleaning robot may rotate the arm motors by designated angles (Operation 582) so that the side arms may be protruded from the main body by the designated angles. Here, the arm motors may be rotated in a regular direction.

The cleaning robot may count the RPM of the arm motors rotated by the designated angles using the angle detector (Operation 583), and may compare the counted number of the angles with a target number of angles. That is, whether or not the protruded angle of the arm motors reaches a first target angle may be judged (Operation 584).

Thereafter, upon judging that the protruded angle of the arm motors reaches the first target angle, the cleaning robot may stop rotation of the arm motors (Operation 585), and may maintain the stopped state of the arm motors so that the protruded state of the side arms may be maintained.

Thereafter, the cleaning robot may judge whether or not a command to insert the side arms into the main body is input (Operation 586), the cleaning robot may rotate the arm motors by the designated angles (Operation 587) so that the side arms may be inserted into the main body by the designated angles. Here, the arm motors may be rotated in the reverse direction.

The cleaning robot may count the RPM of the arm motors rotated by the designated angles using the angle detector (Operation 588), and may compare the counted number of the angles with a target number of angles. That is, whether or not the protruded angle of the arm motors reaches a second target angle may be judged (Operation 589).

Thereafter, upon judging that the protruded angle of the arm motors reaches the second target angle, the cleaning robot may stop rotation of the arm motors (Operation 590), and may maintain the stopped state of the arm motors so that the inserted state of the side arms may be maintained.

Here, the first target angle and the second target angle may have the same displacement.

That is, in order to insert the side arms into the main body, the cleaning robot may rotate the side arms in the reverse direction by the protruded angle of the side arms, thus possibly preventing the arm motors from being further rotated although insertion of the side arms has been completed.

Thereafter, the cleaning robot may initialize the counted angle of the arm motors (Operation 591).

Thereby, if protrusion and insertion of the side arms will be subsequently controlled, the angle of the arm motors used in earlier control may not influence subsequent control.

As is apparent from the above description, in a cleaning robot and a control method thereof in accordance with one or more embodiments, the cleaning robot may protrude side arms of sub-cleaning tools and thus may extend the position of side brushes from the inside to the outside of a main body to expand a cleaning range, thus cleaning regions which a main brush may not contact, such as a region where an obstacle or a wall contacts a floor and a region where walls meet each other.

Further, the side arms provided on the sub-cleaning tools may be inserted into the main body, when the main body is rotated during traveling of the cleaning robot for obstacle tracing, and thus, collision of the cleaning robot with an obstacle or jam of an obstacle into the side arms may be prevented.

Further, the rotational speed and suction force of the main brush provided on the main cleaning tool and the rotational speed of the side brushes provided on the sub-cleaning tools may be controlled based on a distance to an obstacle during traveling of the cleaning robot for obstacle tracing, cleaning efficiency of the cleaning robot with respect to a wall or the obstacle may be improved.

Further, the cleaning robot may insert the side arms of the sub-cleaning tools into the main body in a docking mode or a standby mode and may thus prevent collision with an obstacle during docking or standing by, and may reduce contact load between the side brushes and a floor during docking and may thus dock with a charging station.

Further, the cleaning robot may insert the side arms of the sub-cleaning tools into the main body, may maintain the rotational speed of the main brush, and may decrease the rotational speed of the side brushes so as to suck foreign substances which are not sucked during cleaning and to prevent warping of the side brushes due to friction with the floor, when the amount of power of the battery is not below a reference amount, and may stop rotation of the main brush and the side brushes so as to prevent consumption of the battery before docking with the charging station has been completed, when the amount of the power of the battery is below the reference amount.

Further, the cleaning robot may insert the side arms of the sub-cleaning tools into the main body in a region where a virtual guard is located, and thus may prevent collision with the virtual guard and movement of the position of the virtual guard due to the sub-cleaning tools, and may protect articles in a region restricting entry of the cleaning robot thereto by the virtual guard.

Further, the cleaning robot may judge a jammed state and may control movement of the position of the main body and insertion of the side arms corresponding to jam, and thus may improve the traveling performance of the cleaning robot and may prevent malfunction of the cleaning robot.

Further, the cleaning robot may automatically and manually test abnormality of the sub-cleaning tools, may determine abnormality of the sub-cleaning tools based on results of the test, and may control traveling according to the results of the test, thus possibly improving cleaning efficiency.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A cleaning robot comprising:
a main body to travel on a floor;
an obstacle detector to detect an obstacle around the main body;
a plurality of sub-cleaning tools mounted on the main body configured to be protruded from or retracted at least partially into an inside of the main body, wherein the plurality of sub-cleaning tools includes a first sub-cleaning tool located at a left side of the main body and a second sub-cleaning tool located at a right side of the main body; and
a controller to determinate whether or not rotation of the main body is required while the main body moves forward based on an obstacle detection signal of the obstacle detector,
wherein in response to determining that rotation of the main body is not required while the main body moves forward, the controller controls the plurality of sub-cleaning tools to protrude from the main body,
wherein in response to determining that rotation of the main body is required while the main body moves forward, the controller determines a rotation direction of the main body based on the obstacle detection signal, and identifies a sub-cleaning tool of the plurality of sub-cleaning tools that is on a side of the robot cleaner corresponding to the determined rotation direction, wherein the controller determines a distance to the obstacle based on the obstacle detection signal of the obstacle corresponding to the determined rotation direction, wherein in response to the determination that the rotation of the main body is required while the main body moves forward and a determination that the determined distance to the obstacle exceeds a designated distance, the controller controls retraction of the identified sub-cleaning tool at least partially into the main body, while decreasing a rotational speed of the main body, and wherein when the determined distance does not exceed the designated distance the controller controls the main body to stop rotation of the main body, insert the identified sub-cleaning tool into the main body, and when insertion of the identified sub-cleaning tool is completed the controller controls the rotation of the main body to continue.

2. The cleaning robot according to claim 1, wherein each of the plurality of sub-cleaning tools includes a side arm mounted on the main body so as to be protruded from or retracted at least partially into the inside of the main body, an arm motor rotating the side arm, a side brush rotatably mounted on the side arm, and a brush motor to rotate the side brush.

3. The cleaning robot according to claim 2, wherein the controller controls the arm motor of the first sub-cleaning tool so that the side arm of the first sub-cleaning tool is inserted into the main body, when the determined rotation direction of the main body is a leftward direction, and controls the arm motor of the second sub-cleaning tool so that the side arm of the second sub-cleaning tool is inserted into the main body, when the rotation direction of the main body is a rightward direction.

4. The cleaning robot according to claim 1, wherein the controller controls an arm motor of a first sub-cleaning tool of the plurality of sub-cleaning tools and another arm motor of the second sub-cleaning tool of the plurality of sub-cleaning tools so that the first sub-cleaning tool and the second sub-cleaning tool are protruded from the main body based on the obstacle detection signal of the obstacle detector, upon determining that rotation of the main body is not required.

5. The cleaning robot according to claim 4, wherein upon determining that rotation of the main body is not required, the controller judges the position of the obstacle, controls the arm motor of the first sub-cleaning tool so that the side arm of the first sub-cleaning tool is protruded from the main body, when the position of the obstacle is located at the left of the main body, and controls the arm motor of the second sub-cleaning tool so that the side arm of the second sub-cleaning tool is protruded from the main body, when the position of the obstacle is located at the right of the main body.

6. The cleaning robot according to claim 2, wherein the controller judges the position of the obstacle, and controls the arm motor of the first sub-cleaning tool and the arm motor of the second sub-cleaning tool so that the first sub-cleaning tool and the second sub-cleaning tool are protruded from the main body, when the position of the obstacle is located in front of the main body.

7. The cleaning robot according to claim 2, wherein the controller rotates the arm motor in a first direction by designated angles up to a first target angle during control of protrusion of the at least one sub-cleaning tool, and rotates the arm motor in a second direction by designated angles up to a second target angle during control of insertion of the at least one sub-cleaning tool.

8. The cleaning robot according to claim 1, wherein the controller increases of the rotational speed of a side brush of the at least one protruded sub-cleaning tool during control of protrusion of the at least one sub-cleaning tool.

9. The cleaning robot according to claim 8, further comprising
a main cleaning tool mounted on the lower surface of the main body to perform cleaning,
wherein the controller increases the rotational speed of a main brush of the main cleaning tool during increase of the rotational speed of the side brush of the at least one sub-cleaning tool.

10. The cleaning robot according to claim 1, further comprising
a communicator to communicate with a virtual guard to guide traveling of the main body,
wherein the controller controls the at least one sub-cleaning tool so that the at least one sub-cleaning tool is inserted into the main body, when the communicator receives a virtual guard signal.

11. The cleaning robot according to claim 1, wherein the controller judges whether or not cleaning has been completed, and inserts a side arm of the at least one sub-cleaning tool into the main body and rotates a side brush of the at least one sub-cleaning tool, when cleaning has been completed.

12. The cleaning robot according to claim 1, further comprising
a user interface to receive a command for a test mode to test whether or not the at least one sub-cleaning tool is abnormal and to output results of the test mode,
wherein the controller, when the command for the test mode is input through the user interface, controls an actuation of at least one of protrusion and insertion of the at least one sub-cleaning tool and judges whether or not the at least one sub-cleaning tool is abnormal based on a signal generated when the at least one sub-cleaning tool is operated.

13. The cleaning robot according to claim 1, wherein the controller performs a test mode to test whether or not the at least one sub-cleaning tool is abnormal before traveling of the main body is started.

14. The cleaning robot according to claim 1, further comprising
a switch turned on when the at least one sub-cleaning tool is inserted into the main body and turned off when the at least one sub-cleaning tool is protruded from the main body,
wherein the controller judges whether or not the at least one sub-cleaning tool is abnormal based on an on/off signal transmitted from the switch.

15. The cleaning robot according to claim 1, further comprising
a pose detector to detect a movement amount corresponding to a change of the position and pose of the main body,
wherein the controller judges whether or not jam of the obstacle into the at least one sub-cleaning tool occurs by comparing a target movement amount corresponding to traveling of the main body and the detected movement amount under the condition that the obstacle is detected during traveling of the main body, and controls movement of the main body and insertion of the at least one sub-cleaning tool when a jam of the obstacle into the at least one sub-cleaning tool has occurred.

* * * * *